US012592074B2

(12) United States Patent　　　　(10) Patent No.:　US 12,592,074 B2
Krishnamurthy et al.　　　　　　　　(45) **Date of Patent:　\*Mar. 31, 2026**

(54) SYSTEM AND METHOD FOR AGGREGATING METADATA FOR ITEM IDENTIFICATION USING DIGITAL IMAGE PROCESSING

(71) Applicant: 7-Eleven, Inc., Irving, TX (US)

(72) Inventors: Sailesh Bharathwaaj Krishnamurthy, Irving, TX (US); Tejas Pradip Rode, Coppell, TX (US); Crystal Maung, Dallas, TX (US); Shahmeer Ali Mirza, Celina, TX (US)

(73) Assignee: 7-Eleven, Inc., Irving, TX (US)

( \* ) Notice: Subject to any disclaimer, the term of this patent is extended or adjusted under 35 U.S.C. 154(b) by 311 days.

This patent is subject to a terminal disclaimer.

(21) Appl. No.: 18/474,414

(22) Filed: Sep. 26, 2023

(65) Prior Publication Data

US 2024/0013530 A1　　Jan. 11, 2024

Related U.S. Application Data

(63) Continuation of application No. 17/455,895, filed on Nov. 19, 2021, now Pat. No. 11,823,444, which is a (Continued)

(51) Int. Cl.
G06T 7/90　　　　(2017.01)
G01G 19/414　　(2006.01)
(Continued)

(52) U.S. Cl.
CPC ........... G06V 20/00 (2022.01); G01G 19/414 (2013.01); G06F 18/214 (2023.01); G06F 18/22 (2023.01);
(Continued)

(58) Field of Classification Search
CPC ........ G06V 20/00; G06V 10/44; G06V 10/56; G06V 10/82; G06V 2201/10;
(Continued)

(56) References Cited

U.S. PATENT DOCUMENTS

2005/0276459 A1\*　12/2005　Eames .................. G06F 3/0485
　　　　　　　　　　　　　　　　　　382/141
2012/0328184 A1\*　12/2012　Tang ....................... G06F 18/23
　　　　　　　　　　　　　　　　　　707/706

(Continued)

OTHER PUBLICATIONS

Krishnamurthy, S. B. et al., "Database Management System and Method for Updating a Training Dataset of an Item Identification Model," U.S. Appl. No. 17/455,892, filed Nov. 19, 2021, 78 pages.

(Continued)

*Primary Examiner* — Ali Bayat
(74) *Attorney, Agent, or Firm* — Baker Botts L.L.P.

(57)　　　　ABSTRACT

A system for identifying items based on aggregated metadata obtains images of an item. The system extracts a set of features from images of the item. The system identifies a first value of a first feature associated with a first image of the item. The system identifies a second value of the first feature associated with a second image of the item. The system aggregates the first value and the second value. The system associates the item to the aggregated first value and the second value, where the aggregated first value and the second value represent the first feature of the item. The system adds a new entry for each image of the item to a training dataset associated with an item identification model.

20 Claims, 15 Drawing Sheets

Related U.S. Application Data continuation-in-part of application No. 17/362,261, filed on Jun. 29, 2021, now Pat. No. 11,887,332.

(51) Int. Cl.

| | |
|---|---|
| *G06F 18/214* | (2023.01) |
| *G06F 18/22* | (2023.01) |
| *G06T 7/62* | (2017.01) |
| *G06V 10/44* | (2022.01) |
| *G06V 10/56* | (2022.01) |
| *G06V 20/00* | (2022.01) |

(52) U.S. Cl.
CPC .................. *G06T 7/62* (2017.01); *G06T 7/90* (2017.01); *G06V 10/44* (2022.01); *G06V 10/56* (2022.01); *G06T 2207/10024* (2013.01); *G06T 2207/20081* (2013.01)

(58) Field of Classification Search
CPC .. G06V 10/225; G06V 10/454; G06V 10/764; G06V 10/7747; G06V 10/778; G06V 10/806; G06V 20/52; G01G 19/414; G01G 21/22; G06F 18/214; G06F 18/22; G06T 7/62; G06T 7/90; G06T 2207/10024; G06T 2207/20081; G06T 7/73; G06T 7/74; G06T 2207/10016; G06T 2207/10028; G06T 2207/20084

USPC .......................................................... 382/159
See application file for complete search history.

(56) References Cited

U.S. PATENT DOCUMENTS

| | | | |
|---|---|---|---|
| 2013/0223673 A1 | 8/2013 | Davis et al. | |
| 2013/0248593 A1 | 9/2013 | Bonner et al. | |
| 2019/0108396 A1 | 4/2019 | Dal Mutto et al. | |
| 2019/0220694 A1* | 7/2019 | Biswas .................... | G06N 3/08 |
| 2019/0258878 A1* | 8/2019 | Koivisto ................. | G05D 1/00 |
| 2021/0182922 A1* | 6/2021 | Zheng .................... | H04N 23/69 |
| 2022/0067689 A1* | 3/2022 | Guack .................... | G06T 7/251 |
| 2023/0067026 A1* | 3/2023 | Huts ...................... | G06V 20/00 |

OTHER PUBLICATIONS

Datar, S. V. et al., "System and Method for Capturing Images for Training of an Item Identification Model," U.S. Appl. No. 17/455,894, filed Nov. 19, 2021, 77 pages.

Datar, S. V. et al., "System and Method for Refining an Item Identification Model Based on Feedback," U.S. Appl. No. 17/455,896, filed Nov. 19, 2021, 77 pages.

Partial Search Report for PCT Patent Application No. PCT/US2022/072832, mailed Oct. 6, 2022; 12 pages.

* cited by examiner

106a

106b

302

104

102

Soda

500

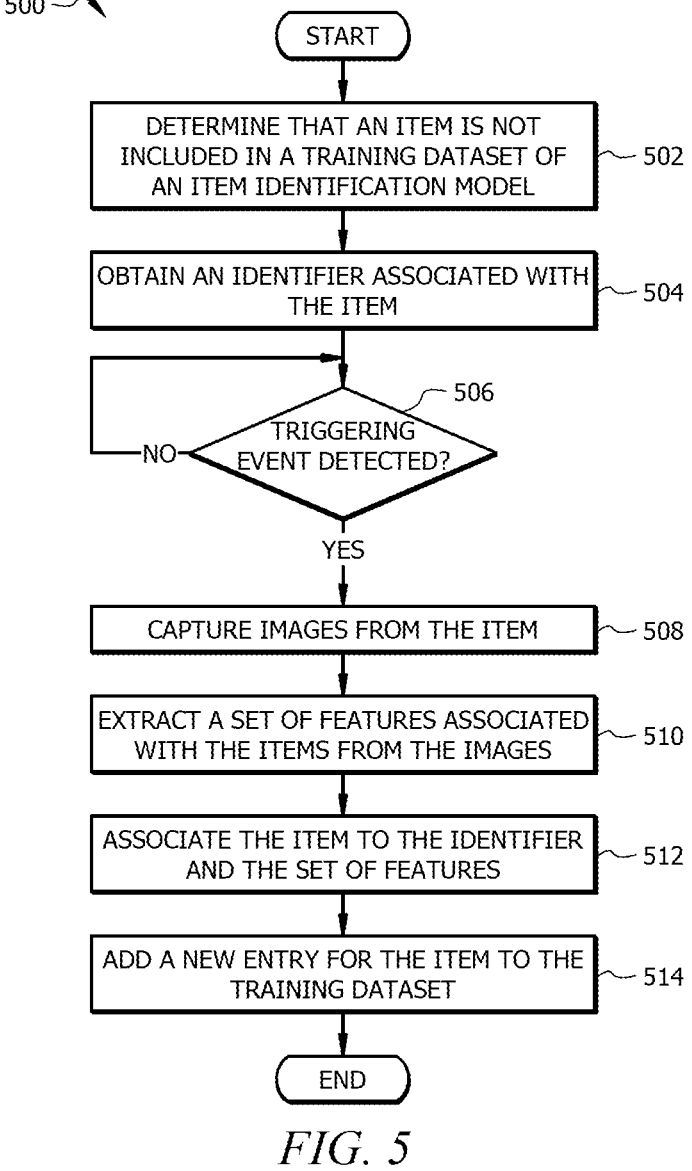

START

DETERMINE THAT AN ITEM IS NOT INCLUDED IN A TRAINING DATASET OF AN ITEM IDENTIFICATION MODEL — 502

OBTAIN AN IDENTIFIER ASSOCIATED WITH THE ITEM — 504

TRIGGERING EVENT DETECTED? — 506

NO

YES

CAPTURE IMAGES FROM THE ITEM — 508

EXTRACT A SET OF FEATURES ASSOCIATED WITH THE ITEMS FROM THE IMAGES — 510

ASSOCIATE THE ITEM TO THE IDENTIFIER AND THE SET OF FEATURES — 512

ADD A NEW ENTRY FOR THE ITEM TO THE TRAINING DATASET — 514

END

FIG. 5

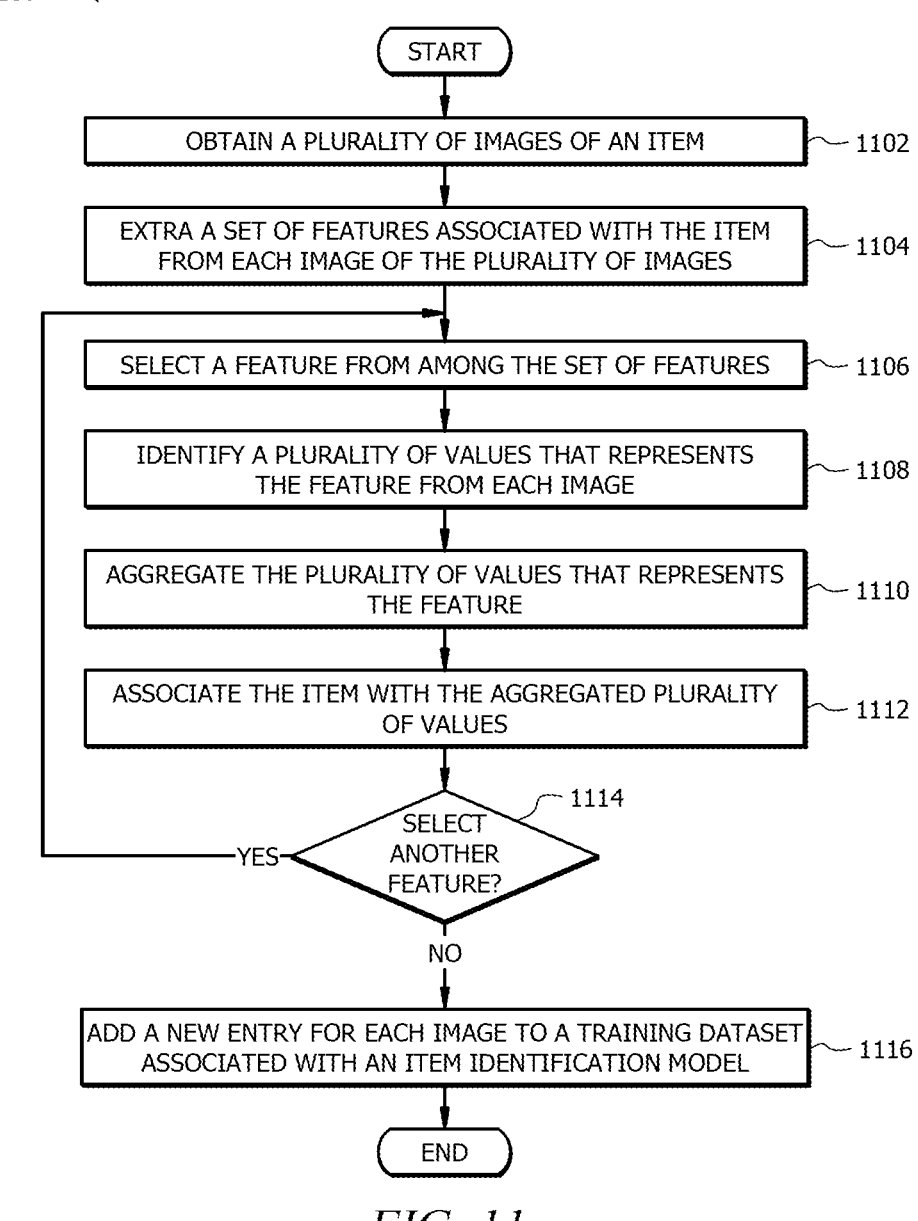

1100

START

OBTAIN A PLURALITY OF IMAGES OF AN ITEM — 1102

EXTRA A SET OF FEATURES ASSOCIATED WITH THE ITEM FROM EACH IMAGE OF THE PLURALITY OF IMAGES — 1104

SELECT A FEATURE FROM AMONG THE SET OF FEATURES — 1106

IDENTIFY A PLURALITY OF VALUES THAT REPRESENTS THE FEATURE FROM EACH IMAGE — 1108

AGGREGATE THE PLURALITY OF VALUES THAT REPRESENTS THE FEATURE — 1110

ASSOCIATE THE ITEM WITH THE AGGREGATED PLURALITY OF VALUES — 1112

SELECT ANOTHER FEATURE? — 1114

YES

NO

ADD A NEW ENTRY FOR EACH IMAGE TO A TRAINING DATASET ASSOCIATED WITH AN ITEM IDENTIFICATION MODEL — 1116

END

*FIG. 11*

SYSTEM AND METHOD FOR AGGREGATING METADATA FOR ITEM IDENTIFICATION USING DIGITAL IMAGE PROCESSING

CROSS-REFERENCE TO RELATED APPLICATIONS

This application is a continuation of U.S. patent application Ser. No. 17/455,895 filed Nov. 19, 2021, and entitled "SYSTEM AND METHOD FOR AGGREGATING META-DATA FOR ITEM IDENTIFICATION USING DIGITAL IMAGE PROCESSING," which is a continuation-in-part of U.S. patent application Ser. No. 17/362,261 filed Jun. 29, 2021, and entitled "ITEM IDENTIFICATION USING DIGITAL IMAGE PROCESSING," which are incorporated herein by reference.

TECHNICAL FIELD

The present disclosure relates generally to digital image processing, and more specifically to a system and method for aggregating metadata for item identification using digital image processing.

BACKGROUND

Identifying and tracking objects within a space using computer vision poses several technical challenges. Conventional systems are unable to identify an item from among multiple items in an image.

SUMMARY

Particular embodiments of systems disclosed in the present disclosure are particularly integrated into a practical application of using computer vision and artificial intelligence to identify items, and features about items, depicted in computer images. Accordingly, the present disclosure improves item identification technology, which can be helpful in a large number of computer vision applications, such as facilitating contactless interactions at a grocery or convenience store. Thus, particular embodiments of the disclosed systems improve digital image processing technologies and various aspects of item identification technologies.

Existing technology typically requires a user to scan or manually identify items to complete an interaction at, for example, a grocery store or convenience store. This creates a bottleneck in the system's ability to quickly identify items and complete item interactions. In contrast, the disclosed systems can identify one or more particular items from among multiple items depicted in a computer image. This provides an additional practical application of identifying multiple items at a time, which reduces the bottleneck and amount of resources that need to be dedicated to the item interaction process. For example, a user can place multiple items on a platform of an imaging device such as, for example, at a grocery store or convenience store checkout. The imaging device may capture one or more images from each of the multiple items. The disclosed system may process the captured one or more images and identify each of the multiple items. These practical applications are described in greater detail below. Although the present disclosure is described with reference to item interactions at a grocery store or convenience store as an example, it should be understood that the technologies described herein have wider application in a variety of other contexts and environments, such as item interaction at different types of warehouses, shipping facilities, transportation hubs (e.g., airports, bus stations, train stations), and the like.

Updating a Training Dataset of an Item Identification Model

The present disclosure contemplates systems and methods for updating a training dataset of an item identification model. The item identification model may be configured to identify items based on their images.

In an example scenario, assume that the item identification model is trained and tested to identify a particular set of items. In some cases, a new item may be added to a list of items that are desired to be identified by the item identification model. One technical challenge currently faced is that to configure the item identification model to be able to identify new items (that the item identification model has not been trained to identify), the item identification technology may go through a retraining process where weight and bias values of perceptrons of neural network layers of the item identification model are changed. However, this process can be time-consuming and requires a lot of processing and memory resources. In addition, it will be challenging to retrain the item identification model for each new item, especially if new items are added to the list of items to be identified by the item identification model frequently.

The disclosed system provides technical solutions for the technical problems mentioned above by configuring the item identification model to be able to identify new items without retraining the item identification model to be able to identify new items, as described below.

Typically, the item identification model of the present disclosure is configured to output an identifier of an item. For example, the item identification model may comprise a set of neural network layers where the output layer provides an identifier of an item. In the disclosed system, the item identification model outputs a set of features of an item instead of an identifier of the item. For example, assume that a new item is added to the list of items to be identified by the item identification model. To this end, the disclosed system feeds an image of the new item to the item identification model and the item identification model extracts the set of features of the new item. The set of features of the item may correspond to the physical attributes of the new item.

The set of features of the item may be represented by a feature vector that comprises a set of numerical values. The disclosed system may associate the extracted feature vector with the new item and store the extracted feature vector in a database, e.g., to a training dataset of the item identification model. In this manner, the features of the new item are added to the training dataset of the item identification model to later identify the new item.

When it is desired to identify the new item, another image of the new item is fed to the item identification model. The disclosed system extracts a set of features from the image. The disclosed system may compare the extracted set of features with a previously provided set of features associated with the new item stored in the training dataset of the item identification model. The disclosed system may identify the new item by determining that the extracted set of features corresponds with the previously provided set of features associated with the new item. In this way, the item identification model described herein avoids the retraining process, which saves time, processing resources, and memory resources.

According to an embodiment, a system for updating a training dataset of an item identification model comprises a plurality of cameras, a memory, and a processor. Each of the plurality of cameras is configured to capture images of at least a portion of a platform. The memory is operable to store a training dataset of an item identification model, where the training dataset comprises a plurality of images of different items. The item identification model is configured to identify items based at least in part upon images of the items. The processor is operably coupled with the memory. The processor is configured to determine that a first item is not included in the training dataset. In response to determining that the first item is not included in the training dataset, the processor may perform one or more operations below. The processor obtains an identifier associated with the first item. The processor detects a triggering event at the platform, where the triggering event corresponds to a user placing the first item on the platform. The processor captures one or more first images from the first item using the plurality of cameras, where the one or more first images are captured from one or more angles. For at least one image from among the one or more first images, the processor extracts a first set of features associated with the first item from the at least one image, where each feature corresponds to a physical attribute of the first item. The processor associates the first item to the identifier and the first set of features. The processor adds a new entry to the training dataset, where the new entry represents the first item labeled with at least one of the identifier and the first set of features.

The disclosed system provides several practical applications and technical advantages, which include: 1) technology that identifies an item based on extracting features of the item from images of the item; 2) technology that improves the item identification technology by configuring an item identification model to be able to identify new items without the need for a retraining process; and 3) technology that improves the item identification technology by identifying multiple items at a time, where multiple items are placed on a platform where images of the multiple items are captured. Each of these technical advantages improves computer vision technology generally, and item identification technology specifically.

As such, the disclosed system may improve the underlying technology associated with processor and memory utilization. For example, by identifying multiple items at a time, the processing and memory resources are utilized more efficiently as opposed to when each item is identified one at a time.

Further, the disclosed system may further improve the underlying technology associated with processor and memory utilization by configuring an item identification model to be able to identify new items without a retraining process, which saves additional processing and memory resources.

Capturing Images for Training an Item Identification Model

The present disclosure further contemplates systems and methods for capturing images for training an item identification model. The captured images may be fed to the item identification model to extract a set of features of an item in the images. Thus, it increases item identification accuracy if the extracted features represent an accurate description of the item.

To this end, multiple images of the item from multiple angles may be captured by multiple cameras. Each image may show a different side of the item. The disclosed system contemplates an unconventional imaging device to capture multiple images of the item from multiple angles. For example, the disclosed imaging device may comprise a platform that is configured to rotate. Thus, when an item is placed on the platform of the imaging device, the platform may rotate, and multiple images of the item from multiple angles may be captured.

According to an embodiment, a system for capturing images for training an item identification model comprises a plurality of cameras, a platform, a memory, and a processor. Each camera from among the plurality of cameras is configured to capture images of at least a portion of the platform. The platform is configured to rotate. The memory is operable to store an item identification model, where the item identification model is configured to identify items based at least in part upon images of the items. The processor is operably coupled with the memory. The processor is configured to obtain an identifier associated with an item. The processor detects a triggering event at the platform, where the triggering event corresponds to a user placing the item on the platform. The processor causes the platform to rotate. The processor causes at least one camera from among the plurality of cameras to capture an image of the item while the platform is rotating. The processor extracts a set of features associated with the item from the image, where each feature corresponds to a physical attribute of the item. The processor associates the item to the identifier and the set of features. The processor adds a new entry to a training dataset of the item identification model, where the new entry represents the item labeled with at least one of the identifier and the set of features.

The disclosed system provides several practical applications and technical advantages, which include: 1) technology that provides an unconventional imaging device, including a platform of the imaging device, that facilitates capturing multiple images of an item from multiple angles; and 2) technology that improves the item identification technology by extracting a more comprehensive set of features of the item from multiple images. Each of these technical advantages improves computer vision technology generally, and item identification technology specifically.

Identifying Items Based on Aggregated Metadata

The present disclosure further contemplates systems and methods for identifying items based on aggregated metadata. As discussed above, multiple images of an item may be captured by an imaging device. Each image may show a different side of the item. Thus, different sets of features may be captured from each image. For example, a first image may show a first part of a logo on the item, and a second image may show a second part of the logo. Similarly, different attributes of the item may be extracted from different images, such as dimensions, dominant colors, masks that define a contour around the item, and boundary boxes around the item, among others. The disclosed system is configured to identify values of each feature from each image and aggregate the identified values of each feature.

For example, the disclosed system may identify values that represent dominant colors of the item from multiple images of the item. The disclosed system may cluster the dominant colors identified in the multiple images and determine the overall dominant colors of the item. In another example, the disclosed system may determine multiple dimensions for the item from the multiple images, and calculate a mean of the multiple dimensions. In another example, the disclosed system may determine multiple two-dimensional masks around the item from multiple images, determine differences between each two adjacent two-dimensional masks, and determine a three-dimensional mask around the item by combining the multiple two-dimensional masks and the determined differences. The aggregated metadata may be added to a database and used to later identify the item.

According to an embodiment, a system for identifying items based on aggregated metadata comprises a memory and a processor. The memory is operable to store a plurality of images of an item, where each image from among the plurality of images shows a different side of the item. The processor is operably coupled with the memory. The processor is configured to obtain the plurality of images of the item. The processor extracts a set of features from each of a first image and a second image from among the plurality of images, where each of the set of features represents a physical attribute of the item. For a first feature from among the set of features, the processor identifies a first value of the first feature associated with the first image of the item. The processor identifies a second value of the first feature associated with the second image. The processor aggregates the first value with the second value. The processor associates the item with the aggregated first value and second value, where the aggregated first value and second value represent the first feature of the item. The processor adds a new entry for each image from among the plurality of images to a training dataset associated with an item identification model. The new entry comprises the item associated with the aggregated first value and the second value. The item identification model is configured to identify the item based at least in part upon images of the item.

The disclosed system provides several practical applications and technical advantages, which include: 1) technology that improves item identification technology by identifying values of each feature extracted from multiple images of an item and aggregating metadata that represent each feature; and 2) technology that provides a more comprehensive set of features that describes an item.

Thus, by utilizing a more comprehensive set of features that describes an item, the item can be described more accurately. Therefore, the item can be identified more quickly and with a higher accuracy. This further improves the item identification technology.

Further, since a more comprehensive description of the item is used, there is less burden on computational resources for identifying the item. Thus, less computational resources may be utilized for identifying the item. Thus, the disclosed system may improve the underlying technology associated with processing and memory utilization.

Refining an Item Identification Model Based on Feedback

The present disclosure further contemplates systems and methods for refining an item identification model based on feedback. In an example scenario, assume that a user places an item on a platform of an imaging device. The imaging device captures images of the item and transmits the captured images to the item identification model to identify the item. In some cases, the item may not be fully visible in the captured images. For example, a portion of the item may be obstructed by other items. In such cases, the identification model may not identify the item correctly. The disclosed system may present the item on a graphical user interface. The user may indicate that the item is not identified correctly on the graphical user interface. The user may scan an identifier of the item, e.g., a barcode of the item. The disclosed system may use the identifier of the item as feedback to refine the item identification model. For example, the disclosed system may associate the item to the captured images. The disclosed system may retrain the identification model to learn to associate the item to the captured images. The disclosed system may update a set of features of the item based on the determined association between the item and the captured images.

According to an embodiment, a system for refining an item identification model comprises a plurality of cameras, a memory, and a processor. Each of the plurality of cameras is configured to capture one or more images of at least a portion of a platform. The memory is operable to store an item identification model, where the item identification model is configured to identify the item based at least in part upon images of the item. The processor is operably coupled with the memory. The processor is configured to detect a triggering event at the platform, where the triggering event corresponds to a user placing the item on the platform. The processor captures one or more images of the item using the plurality of cameras, where the one or more images are captured from one or more angles. The processor extracts a set of features from at least one of the one or more images, where each of the set of features corresponds to a physical attribute of the item. The processor identifies the item based at least in part upon the set of features. The processor receives an indication that the item is not identified correctly. The processor receives an identifier of the item. The processor identifies the item based at least in part upon the identifier of the item. The processor feeds the identifier of the item and the one or more images to the item identification model. The processor retrains the item identification model to learn to associate the item to the one or more images. The processor updates the set of features based at least in part upon the determined association between the item and the one or more images.

The disclosed system provides several practical applications and technical advantages, which include a technology that improves item identification technology by using feedback received from users to determine incorrectly identified items and refine an item identification technology to be able to identify those items correctly in the future.

Thus, by refining the item identification technology based on feedback, the accuracy in item identification can be improved. Thus, the item identification model may be able to identify items with more confidence, accuracy, and more quickly.

Further, since the item identification is improved, there is less burden on computational resources used for identifying items. Thus, the disclosed system may improve the underlying technology associated with processing and memory utilization.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, where like reference numerals represent like parts.

FIG. 5 illustrates an example flowchart of a method for updating a training dataset of an item identification model for use in conjunction with the system of FIG. 1;

FIG. 11 illustrates an example flowchart of a method for identifying items based on aggregated metadata for use in conjunction with the system of FIG. 6;

DETAILED DESCRIPTION

As described above, previous technologies fail to provide efficient and reliable solutions to 1) update a training dataset of an item identification model; 2) capture images for training an item identification model; 3) identify items based on aggregated metadata; and 4) refine an item identification model based on feedback. This disclosure provides various systems and methods that provide technical solutions to the technical problems described herein.

Example System for Updating a Training Dataset of an Item Identification Model

Figure 1:
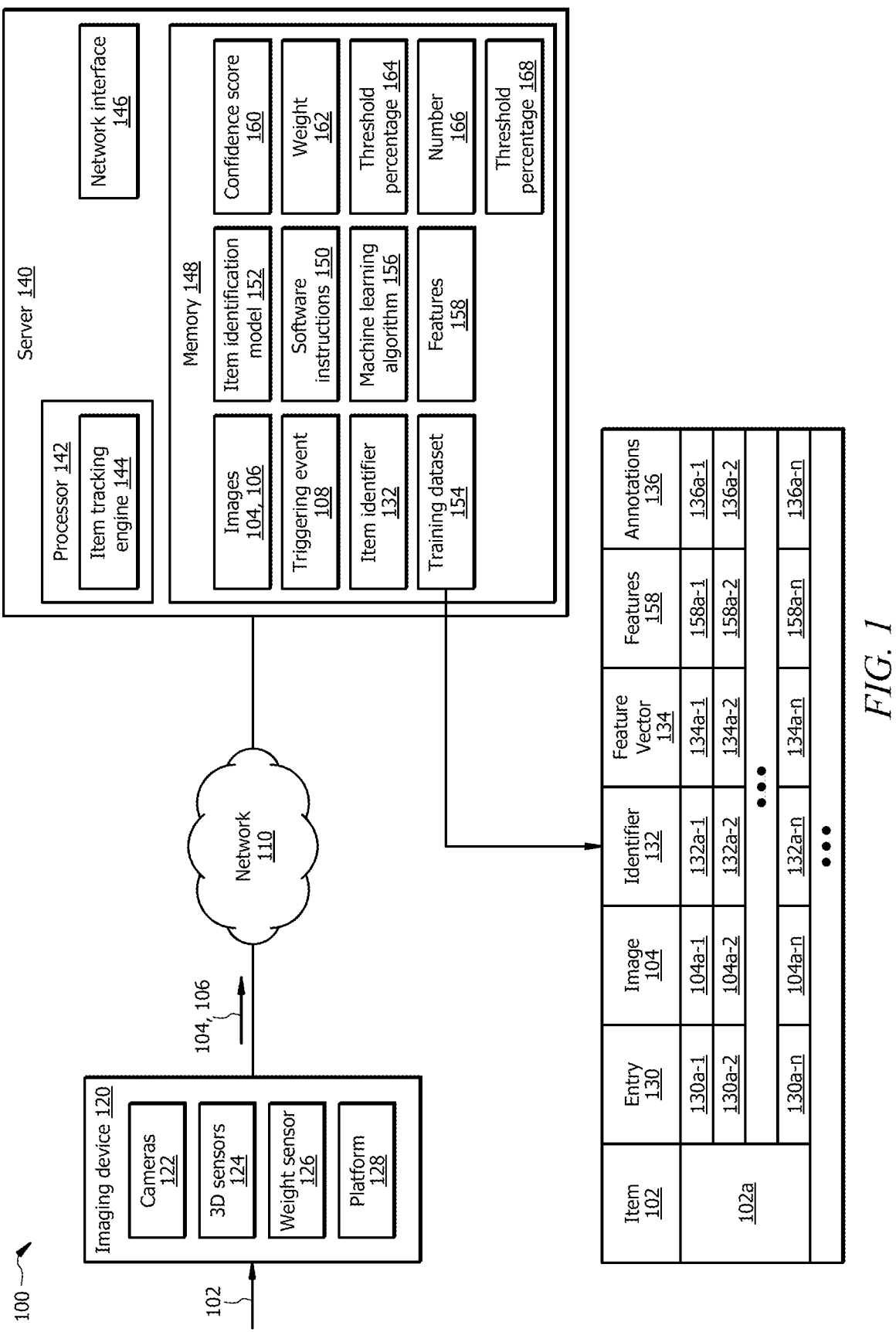
FIG. 1 illustrates one embodiment of a system that is configured to update a training dataset of an item identification model.

FIG. 1 illustrates one embodiment of a system 100 that is configured to update a training dataset 154 of an item identification model 152. In one embodiment, system 100 comprises a server 140 communicatively coupled to an imaging device 120 using a network 110. Network 110 enables the communication between components of the system 100. Server 140 comprises a processor 142 in signal communication with a memory 148. Memory 148 stores software instructions 150 that when executed by the processor 142, cause the processor 142 to perform one or more functions described herein. For example, when the software instructions 150 are executed, the processor 142 executes an item tracking engine 144 to detect one or more items 102 placed on a platform 128 of the imaging device 120, and add a new entry 130 for each detected item 102 to the training dataset 154. In other embodiments, system 100 may not have all of the components listed and/or may have other elements instead of, or in addition to, those listed above.

System Components

Network

Network 110 may be any suitable type of wireless and/or wired network, including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 110 may be configured to support any suitable type of communication protocol as would be appreciated by one of ordinary skill in the art.

Example Imaging Device

Imaging device 120 is generally configured to capture images 104 and depth images 106 of items 102 that are placed on the platform 128 of the imaging device 120. In one embodiment, the imaging device 120 comprises one or more cameras 122, one or more three-dimensional (3D) sensors 124, one or more weight sensors 126, and a platform 128. Additional information about the hardware configuration of the imaging device 120 is described in FIG. 2.

Each camera 122 is configured to capture images 104 of at least a portion of the platform 128. For example, when an item 102 is placed on the platform 128, the cameras 122 are configured to capture images 104 (e.g., RGB images) of the item 102. Examples of cameras 122 include, but are not limited to, cameras, 3D cameras, 2D cameras, video cameras, web cameras, and printed circuit board (PCB) cameras.

Each 3D sensor 124 is configured to capture depth images 106 of at least a portion of the platform 128. For example, when an item 102 is placed on the platform 128, the 3D sensors 124 are configured to capture depth images 106 (e.g., depth maps or point clouds) of the item 102. Examples of 3D sensors 124 include, but are not limited to, depth-sensing cameras, time-of-flight sensors, LiDARs, structured light cameras, or any other suitable type of depth sensing device. In some embodiments, a camera 122 and a 3D sensor 124 may be integrated within a single device. In other embodiments, a camera 122 and a 3D sensor 124 may be distinct devices.

Each weight sensor 126 is configured to measure the weight of items 102 that are placed on the platform 128 of the imaging device 120. For example, a weight sensor 126 may comprise a transducer that converts an input mechanical force (e.g., weight, tension, compression, pressure, or torque) into an output electrical signal (e.g., current or voltage). As the input force increases, the output electrical signal may increase proportionally. The item tracking engine 144 is configured to analyze the output electrical signal to determine an overall weight 162 for the items 102 on the weight sensor 126. Examples of weight sensors 126 include, but are not limited to, a piezoelectric load cell or a pressure sensor. For example, a weight sensor 126 may comprise one or more load cells that are configured to communicate electrical signals that indicate a weight 162 experienced by the load cells. For instance, the load cells may produce an electrical current that varies depending on the weight or force experienced by the load cells. The load cells are configured to communicate the produced electrical signals to the server 140 (and consequently to the item tracking engine 144) for processing.

The platform 128 comprises a flat surface on which items 102 may be placed. Details of the platform 128 are described in FIG. 2.

Server

Server 140 is generally any device that is configured to process data and communicate with other computing devices, databases, systems, etc., via the network 110. The server 140 may also be referred to as an item tracking device. Examples of the server 140 include, but are not limited to, a server, a computer, a laptop, a tablet, or any other suitable type of device. In FIG. 1, the imaging device 120 and the server 140 are shown as two devices. In some embodiments, the imaging device 120 and the server 140 may be integrated within a single device. The server 140 is generally configured to oversee the operations of the item tracking engine 144, as described further below in conjunction with the operational flow of the system 100 and method 500 described in FIG. 5.

Processor 142 comprises one or more processors operably coupled to the memory 148. The processor 142 is any electronic circuitry including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The processor 142 may be a programmable logic device, a microcontroller, a microprocessor, or any suitable combination of the preceding. The processor 142 is communicatively coupled to and in signal communication with the memory 148 and the network interface 146. The one or more processors are configured to process data and may be implemented in hardware or software. For example, the processor 142 may be 8-bit, 16-bit, 32-bit, 64-bit, or of any other suitable architecture. The processor 142 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute software instructions 150 to implement the item tracking engine 144. In this way, processor 142 may be a special-purpose computer designed to implement the functions disclosed herein. In an embodiment, the item tracking engine 144 is implemented using logic units, FPGAs, ASICs, DSPs, or any other suitable hardware. The item tracking engine 144 is configured to operate as described in FIGS. 1-5. For example, the item tracking engine 144 may be configured to perform the operations of method 500 as described in FIG. 5.

Memory 148 is operable to store any of the information described above with respect to FIGS. 1-15 along with any other data, instructions, logic, rules, or code operable to implement the function(s) described herein when executed by the processor 142. The memory 148 comprises one or more disks, tape drives, or solid-state drives, and may be used as an over-flow data storage device, to store programs when such programs are selected for execution, and to store instructions and data that are read during program execution. The memory 148 may be volatile or non-volatile and may comprise a read-only memory (ROM), random-access memory (RAM), ternary content-addressable memory (TCAM), dynamic random-access memory (DRAM), and static random-access memory (SRAM).

The memory 148 is operable to store the software instructions 150, item identification model 152, item images 104, depth images 106, training dataset 154, item identifier 132, features 158, machine learning algorithm 156, triggering event 108, confidence scores 160, weights 162, threshold percentage 164, number 166, threshold percentage 168, and/or any other data or instructions. The software instructions 150 may comprise any suitable set of instructions, logic, rules, or code operable to execute the item tracking engine 144. The number 166 may represent a particular number of dominant colors of an item 102, such as one, two, three, four, five, etc.

Network interface 146 is configured to enable wired and/or wireless communications. The network interface 146 is configured to communicate data between the server 140 and other devices, systems, or domains. For example, the network interface 146 may comprise an NFC interface, a Bluetooth interface, a Zigbee interface, a Z-wave interface, a radio-frequency identification (RFID) interface, a WIFI interface, a LAN interface, a WAN interface, a PAN interface, a modem, a switch, or a router. The processor 142 is configured to send and receive data using the network interface 146. The network interface 146 may be configured to use any suitable type of communication protocol as would be appreciated by one of ordinary skill in the art.

Item Tracking Engine

Item tracking engine 144 may be implemented by the processor 142 executing the software instructions 150, and is generally configured to process images 104 and depth images 106 to identify items 102 that are placed on the platform 128 of the imaging device 120. In the present disclosure, an image 104 of an item 102 may be interchangeably referred to as an item image 104. Operations of the item tracking engine 144 are described in detail further below in conjunction with the operational flow of the system 100 and method 500 described in FIG. 5. The corresponding description below includes a brief description of certain operations of the item tracking engine 144.

In one embodiment, the item tracking engine 144 is implemented by a machine learning algorithm 156 to process item images 104 and depth images 106. For example, the machine learning algorithms 156 may include, but are not limited to, a support vector machine, neural network, random forest, k-means clustering, etc. In other examples, the machine learning algorithms 156 may include, but are not limited to, a multi-layer perceptron, a recurrent neural network (RNN), an RNN long short-term memory (LSTM), a convolution neural network (CNN), a transformer, or any other suitable type of neural network model. The item tracking engine 144 may implement the machine learning algorithm 156 to implement and execute the item identification model 152.

In one embodiment, the machine learning algorithm 156 is generally configured to receive an image 104 of an item 102 as an input and extract a set of features 158 from the item image 104. Similarly, the item tracking engine 144 may receive a depth image 106 of an item 102 and extract the set of features 158 from the depth image 106. Each feature 158 may correspond to and/or describe a physical attribute of the item 102.

The set of features 158 may be represented by a feature vector 134 that comprises a set of numerical values. For example, the set of features 158 may include, but not limited to: 1) one or more dominant colors of the item 102; 2) a dimension of the item 102; 3) a bounding box around the item 102; 4) a mask that defines a contour around the item 102; 5) a shape of the item 102; 6) edges of the item 102; and 7) a logo displayed on the item 102. Each of these features 158 of an item 102 is described in greater detail below.

Each dominant color of the item 102 is determined based on determining colors of pixels that illustrate the item 102 in the item image 104 and/or depth image 106, determining percentages of the numbers of pixels that have different colors, and determining one or more colors that have percentages of number of pixels more than a threshold percentage 164.

In one embodiment, the item tracking engine 144 may be configured to detect a particular number 166 (e.g., three, five, or any other number) of dominant colors of the item 102 in the image item 104 and/or depth image 106. The item tracking engine 144 (e.g., via the machine learning algorithm 156) may determine percentages of numbers of pixels that illustrate the item 102 and rank them in descending order. The item tracking engine 144 (e.g., via the machine learning algorithm 156) may detect the top particular number 166 of dominant colors in the ranked list of colors of the item 102. The item tracking engine 144 may determine a percentage of a particular dominant color of an item 102 in an item image 104 by determining a ratio of a number of pixels that have the particular dominant color in relation to the total number of pixels illustrating the item 102 in the item image 104.

For example, assume that the particular number 166 of dominant colors is three. Also, assume that the item tracking engine 144 detects that 40% of pixels that illustrate the item 102 in the image 104 are blue, 35% of pixels that illustrate the item 102 in the image 104 are red, 32% of pixels that illustrate the item 102 in the image 104 are green, and the rest of the colors have smaller percentages of numbers of pixels. In this example, the item tracking engine 144 determines that the top three dominant colors of the item 102 in the image 104 are blue, red, and green.

In one embodiment, the item tracking engine 144 may be configured to detect dominant colors of the item 102 in the image 104 that have percentages of numbers of pixels more than a threshold percentage 164, such as 40%, 42%, etc. Each dominant color may be determined based on determining that a number of pixels that have the dominant color is more than a threshold number. In this case, the item tracking engine 144 (via the machine learning algorithm 156) may determine percentages of numbers of pixels that illustrate the item 102 in the image 104, rank them in descending order, and determine the top dominant colors that have percentages of a number of pixels more than the threshold percentage 164.

The dimension of the item 102 in the image 104 may be represented by a length, a weight, and a height of the item 102.

The bounding box around the item 102 may correspond to a shape (e.g., a rectangular, a square, any other geometry) that forms a boundary around the item 102.

The mask of the item 102 may define a contour around the item 102. For example, the mask of the item 102 may have a higher resolution compared to the bounding box, meaning that the mask around the item 102 may represent a more accurate representation of edges and lines that form the item 102.

In one embodiment, the machine learning algorithm 156 may include a supervised machine learning algorithm, where the machine learning algorithm 156 may be trained using training dataset 154 that comprises item images 104 and depth images 106 of items 102 with their corresponding labels, e.g., item identifiers 132, feature vectors 134, features 158, annotations 136, etc.

Figure 4:
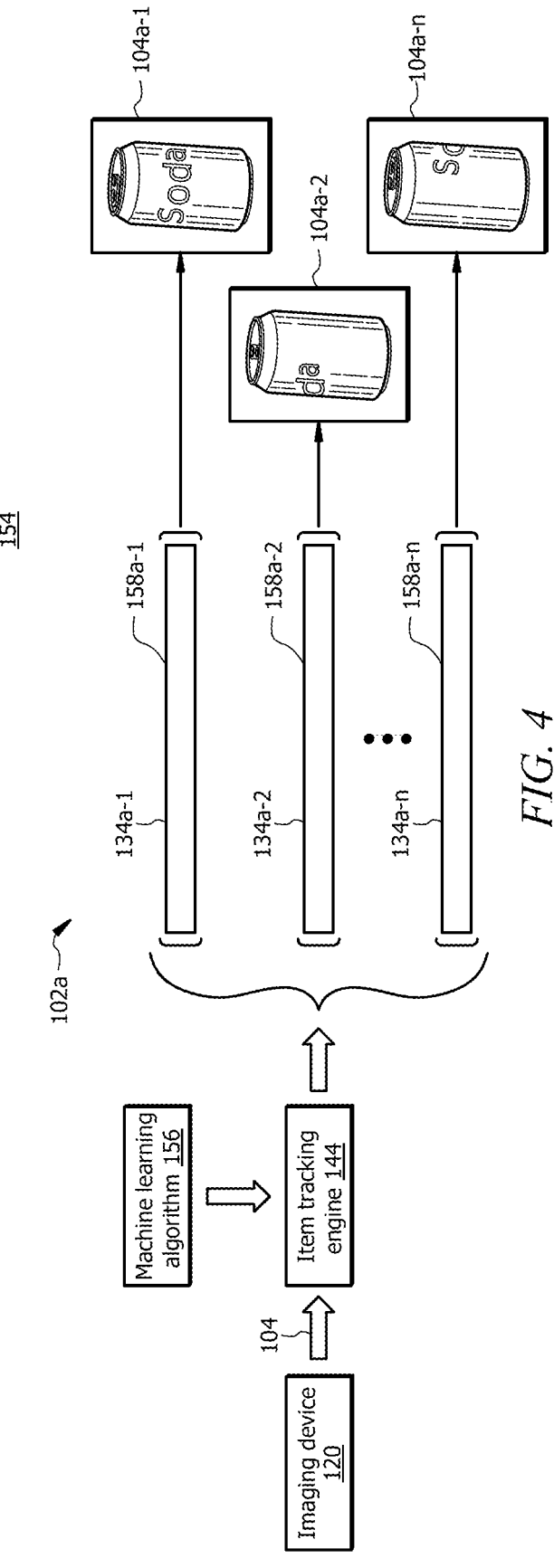
FIG. 4 illustrates an example embodiment of the training dataset of an item identification model for use in conjunction with the system of FIG. 1.

Details of the training dataset 154 are described in FIG. 4. In brief, the training dataset 154 comprises multiple entries 130 for each item 102. Each entry 130 may be associated with one image 104 of an item 102. Each image 104 of an item 102 may be associated with a set of features 158 represented by a feature vector 134. Each image 104 of an item 102 may be associated with a corresponding identifier 132 of the item 102. For example, an identifier 132 of the item 102 may include a label, a barcode, a Quick Response (QR) code, and/or the like.

Each entry 130 may be associated with one or more annotations 136. In one embodiment, an annotation 136 may be used to reduce a search space during identifying an item 102 placed on the platform 128. For example, the one or more annotations 136 may include a dimension (e.g., a length, a height, a weight), a dimension range (e.g., a length range, a height range, a weight range), one or more dominant colors, an item category (e.g., a type of an item, such as a can, a bottle, a candy, etc.), a logo, a brand, a shape, a weight, a weight range, among other aspects of the item 102. For example, if the item tracking engine 144 determines that an annotation 136 of an item 102 placed on the platform 128 of the imaging device 120 comprises an item category of bottle, the item tracking engine 144 may search among those entries 130 that are associated with the same item category for identifying the item 102, hence, reducing the search space. This provides practical applications of reducing computational complexity and utilizing processing and memory resources for identifying the item 102 more efficiently.

In the example of FIG. 1, the training dataset 154 comprises entries 130*a*-1, 130*a*-2, and 130*a*-*n* for item 102*a*. The training dataset 154 may include other entries 130 for other items 102. With respect to item 102*a*, entry 130*a*-1 is associated with an image 104*a*-1 of the item 102*a*. The entry 130*a*-1 is associated with identifier 132*a*-1, feature vectors 134*a*-1, features 158*a*-1, and annotations 136*a*-1. The entry 130*a*-2 is associated with identifier 132*a*-2, feature vectors 134*a*-2, features 158*a*-2, and annotations 136*a*-2. Similarly, each entry 130 in the training dataset 154 may be associated with one depth image 106 of an item 102. Each depth image 106 of the item 102 may be associated with a set of features 158 represented by a feature vector 134. Each depth image 106 of the item 102 may be associated with a corresponding identifier 132 of the item 102 and annotations 136.

During the training process of the machine learning algorithm 156, the machine learning algorithm 156 determines weights and bias values of the neural network layers of the machine learning algorithm 156 that allow the machine learning algorithm 156 to map images 104 of items 102 to different labels, e.g., item identifiers 132, features 158, feature vectors 134, annotations 136, etc. Through this process, the machine learning algorithm 156 is able to identify items 102 within an image 104. The item tracking engine 144 may be configured to train the machine learning algorithm 156 using any suitable technique. In some embodiments, the machine learning algorithm 156 may be stored and/or trained by a device that is external from the server 140. Similarly, the machine learning algorithm 156 may be trained to map depth images 106 of items 102 to their corresponding labels, e.g., item identifiers 132, features 158, feature vectors 134, and annotations 136.

In an example operation, assume that an item 102 is placed on the platform 128. The imaging device 120 may capture one or more images 104 of the item 102. The imaging device 120 may send the captured images 104 to the server 140 for processing. The item tracking engine 144 (e.g., via the machine learning algorithm 156) may extract a set of features 158 from an image 104 of the item 102, where the set of features 158 is represented by a feature vector 134.

The item tracking engine 144 may compare the captured feature vector 134 with each feature vector 134 previously stored in the training dataset 154. In this process, the item tracking engine 144 may perform a dot product between the captured feature vector 134 and each feature vector 134 previously stored in the training dataset 154. By this process, the item tracking engine 144 may determine a confidence score 160 for each comparison, where the confidence score 160 may represent the similarity between a first feature vector 134 (extracted from the image 104 of the item 102 on the platform 128) and a second feature vector 134 associated with an item 102 stored in the training dataset 154. The confidence score 160 may be represented by a percentage, e.g., 80%, 85%, etc.

The item tracking engine 144 identifies an item 102 in the training dataset 154 that is associated with the highest confidence score 160 from among the confidence scores 160. The item tracking engine 144 may determine that the item 102 (placed on the platform 128) corresponds to the identified item 102 in the training dataset 154 that is associated with the highest confidence score 160.

In one embodiment, the item tracking engine 144 may determine that the first item 102 placed on the platform 128 corresponds to a second item 102 stored in the training dataset 154, if more than a threshold percentage (e.g., 80%, 85%, etc.) of the set of features 158 extracted from the image 104 of the first item 102 corresponds to counterpart features from the set of features 158 associated with the second item 102 stored in the training dataset 154.

Similarly, the imaging device 120 may capture one or more depth images 106 of the item 102, send the captured depth images 106 to the server 140, and the item tracking engine 144 may extract the set of features 158 from a depth image 106 of the item 102. The item tracking engine 144 may compare the extracted set of features 158 with each set of features 158 previously stored in the training dataset 154 by calculating a Euclidian distance between a first feature vector 134 extracted from a depth image 106 of the item placed on the platform 128 and a second feature vector 134 previously stored in the training dataset 154. The Euclidian distance may correspond to the similarity between the first feature vector 134 and the second feature vector 134. If the Euclidian distance is less than a threshold distance (e.g., 1%, 2%, 3%, etc.), the item tracking engine 144 may determine that a first item 102 associated with the first feature vector 134 corresponds to the second item 102 associated with the second feature vector 134 stored in the training dataset 154.

Operational Flow for Updating a Training Dataset of an Item Identification Model In one embodiment, the operational flow of the system 100 may include operations to determine that an item 102 is not included in the training dataset 154, and in response, add a new entry 130 for the new item 102 in the training dataset 154. For example, assume that a new item 102 is added to a physical store. The machine learning algorithm 156 may need to be configured to identify the new item 102.

In one potential approach, a machine learning model is retrained to be able to identify the new item 102. In the retraining process, weight and bias values of perceptron of neural network layers of the machine learning model are revised to be able to detect the new item 102. However, retraining a model may be time-consuming and consume a lot of computational resources. The present disclosure discloses a technology that enables the machine learning algorithm 156 to identify new items 102 without retraining the machine learning algorithm 156, thereby saving time and computational resources. This process is described below.

The machine learning algorithm 156 may include an input layer, one or more hidden layers, and an output layer. The input layer is the first layer of the machine learning algorithm 156 that receives an image 104 of an item 102. The one or more hidden layers may include at least one convolution layer to extract features 158 of the item 102 from pixels of the image 104.

Conventionally, the machine learning algorithm 156 may be trained to output an identifier of an item 102 detected in the image 104. For example, the output layer may include a plurality of perceptrons, where each perceptron outputs a different identifier of an item 102, e.g., a particular bottle, a particular candy, etc. Thus, if a new item 102 is added, a new perceptron may need to be added to the output layer of the machine learning algorithm 156 and the machine learning algorithm 156 may need to be retrained to be able to identify the new item 102. However, if the output layer of the machine learning algorithm 156 is configured to represent extracted features 158 of items 102, adding new items 102 may not cause retraining the machine learning algorithm 156. This technique may obviate retraining the machine learning algorithm 156, reduce computational complexity caused by retraining the machine learning algorithm 156, and optimize processing and memory resource efficiency. Thus, in one embodiment, the machine learning algorithm 156 may be configured to output features 158 of items 102 in the output layer.

Determining that an Item is not Included in a Training Dataset

In one embodiment, the operational flow of the system 100 may begin when the item tracking engine 144 determines that an item 102 is not included in the training dataset 154. For example, the item tracking engine 144 may determine that the item 102 is not included in the training dataset 154 if the item tracking engine 144 receives an image 104 of the item 102, extracts features 158 of the item 102 from the image 104, and determines that no image 104 in the training dataset 154 has corresponding (or matching) features 158.

In response to determining that the item 102 is not included in the training dataset 154, the item tracking engine 144 may perform operations described below to add a new entry 130 representing the item 102 to the training dataset 154 without retraining the training dataset 154.

The item tracking engine 144 may obtain an identifier 132 associated with the item 102. In this process, the item tracking engine 144 may obtain a scan of a barcode associated with the item 102. For example, the item tracking engine 144 may obtain the scan of the barcode associated with the item 102 when a user scans the barcode of the item 102, for example, using a barcode scanner. In other examples, the item tracking engine 144 may obtain a scan of a QR code, a label, or any other identifier that uniquely identifies the item 102.

Detecting a Triggering Event at the Platform

Figure 2:
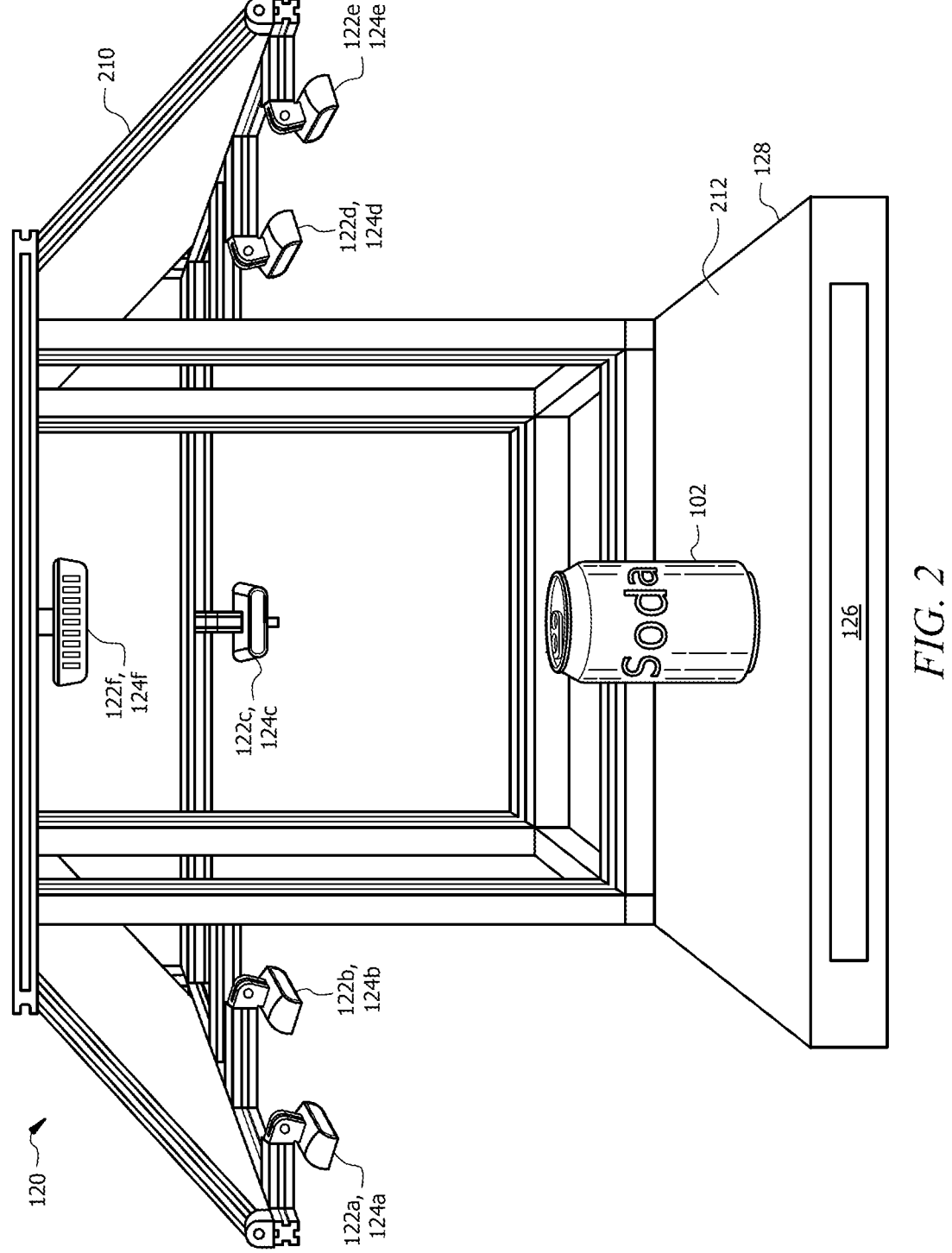
FIG. 2 illustrates a perspective view of a first embodiment of an imaging device for use in conjunction with the system of FIG. 1.

The item tracking engine 144 detects a triggering event 108 at the platform 128 (illustrated in FIG. 2). The triggering event 108 may correspond to a user placing the item 102 on the platform 128.

In one embodiment, the item tracking engine 144 may detect the triggering event 108 at the platform 128 based on the images 104 captured by the cameras 122.

To this end, the imaging device 120 may capture a reference image 104 of the platform 128 when no item 102 is placed on the platform 128. The imaging device 120 may send the reference image 104 to the server 140. When an item 102 is placed on the platform 128, the imaging device 120 may capture an image 104 of the item 102 on the platform 128. The imaging device 120 may send the image 104 to the server 140. The item tracking engine 144 may compare the reference image 104 with the image 104. The item tracking engine 144 may determine that the item 102 is placed on the platform 128 based on the differences between the reference image 104 and the image 104.

Figure 3A:
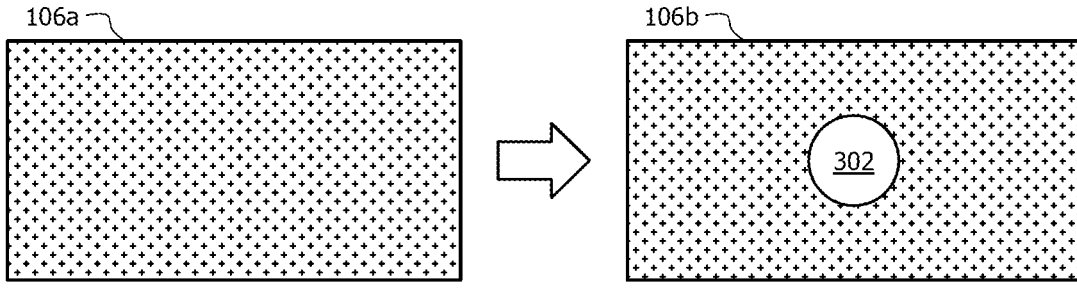
FIG. 3A illustrates example top-view depth images of a platform of the imaging device illustrated in FIG. 2, before and after an item is placed on the platform.
Figure 3B:
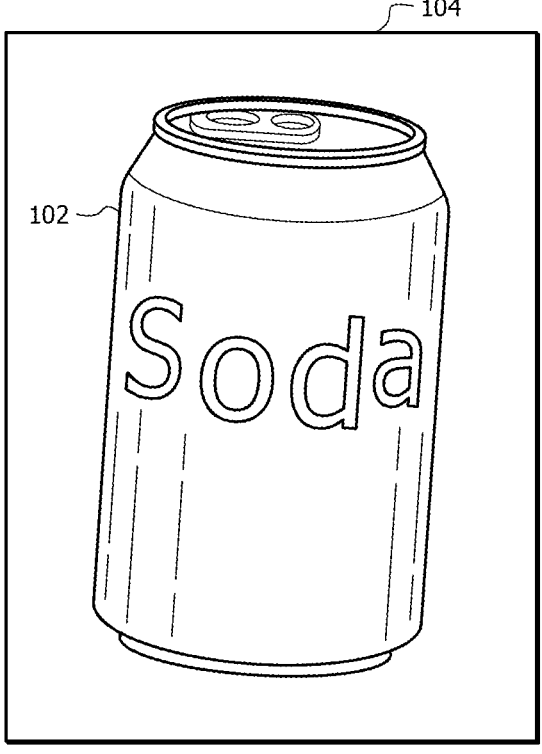
FIG. 3B illustrates an example perspective image of an item detected on a platform of the imaging device illustrated in FIG. 2.

In one embodiment, the item tracking engine 144 may detect the triggering event 108 at the platform 128 based on depth images 106 captured by 3D sensors 124, similar to that described in FIGS. 3A and 3B. To this end, the imaging device 120 may capture a reference depth image 106 of the platform 128 when no item 102 is placed on the platform 128. The imaging device 120 may send the reference depth image 106 to the server 140. The imaging device 120 may capture a depth image 106 of an item 102 on the platform 128 when the item 102 is placed on the platform 128. The imaging device 120 may send the depth image 106 to the server 140. The item tracking engine 144 may compare the reference depth image 106 with the depth image 106. The item tracking engine 144 may detect that the item 102 is placed on the platform 128 based on the differences between the reference depth image 106 and the depth image 106.

In one embodiment, the item tracking engine 144 may detect the triggering event 108 at the platform 128 based on weight changes at the platform 128 detected by the weight sensor 126. In this process, when no item 102 is placed on the platform 128, the weight sensor 126 may detect that there is no item 102 is on the platform 128 because no pressure or weight is sensed by the weight sensor 126. When an item 102 is placed on the platform 128, the weight sensor 126 may detect a weight 162 of the item 102, e.g., a weight change. The imaging device 120 may send the detected weight 162 of the item 102 to the server 140. The item tracking engine 144 may detect the triggering event 108 based on the detected weight 162 of the item 102.

In one embodiment, the item tracking engine 144 may detect the triggering event 108 at the platform 128 based on detecting that an object has entered a virtual curtain or boundary around the platform 128. The object may include an item 102, a hand of a user, etc. For example, the item tracking engine 144 may define a virtual curtain around the platform 128, e.g., by implementing image processing.

In certain embodiments, the item tracking engine 144 may detect the triggering event 108 by aggregating one or more indications detected from differences between images 104 and the reference image 104 of the platform 128, differences between depth images 106 and reference depth image 106 of the platform 128, weight change 162 on the platform 128, and/or an object entering the virtual curtain around the platform 128.

Capturing Image(s) of the Item and Extracting Features of the Item

The imaging device 120 may capture one or more images 104 of the item 102 using the cameras 122. The cameras 122 may be placed at different locations with respect to the platform 128. An example configuration of arrangements of the cameras 122 is described in FIG. 2. The one or more images 104 may be captured from one or more angles. Example images 104 are illustrated in FIG. 4. The imaging device 120 may send the one or more images 104 to the server 140. The item tracking engine 144 may perform the following operations for each image 104 of the item 102.

The item tracking engine 144 may extract a set of features 158 associated with the item 102 from the image 104, e.g., by feeding the image 104 to the machine learning algorithm 156, similar to that described above. The item tracking engine 144 may associate the item 102 to the identifier 132 and the set of features 158.

The item tracking engine 144 may add a new entry 130 to the training dataset 154, where the new entry 130 may represent the item 102 labeled with the identifier 132 and the set of features 158.

In some embodiments, the item tracking engine 144 may add a new entry 130 for each captured image 104 of the new item 102 to the training dataset 154, where each new entry 130 is associated with a set of features 158, identifier 132, feature vector 134, and/or annotations 136, similar to that described above. The item tracking engine 144 may perform a similar operation for one or more depth images 106 of the item 102 placed on the platform 128.

Identifying the New Item

Now that the new item 102 is added to the training dataset 154, it can be identified by the item tracking engine 144, as described below.

For example, assume that the new item 102 is placed on the platform 128. The item tracking engine 144 may detect a second triggering event 108 at the platform 128, similar to that described above. The imaging device 120 may capture one or more second images 104 of the item 102 using the cameras 122. The imaging device 120 may send the one or more second images 104 to the server 140.

The item tracking engine 144 may extract a second set of features 158 associated with the item 102 from each of the one or more second images 104. The item tracking engine 144 may compare the extracted second set of features 158 with the set of features 158 previously extracted and stored in the training dataset 154.

In one embodiment, the item tracking engine 144 may determine that the new item 102 corresponds to the item 102 previously stored in the training dataset 154 if it is determined that more than a threshold percentage 168 (e.g., more than 80%, 85%, etc.) of the second set features 158 corresponds to counterpart features 158 of the previously extracted set of features 158, similar to that described above.

In certain embodiments, the item tracking engine 144 may perform a similar operation for depth images 106 of the item 102. For example, the item tracking engine 144 may receive one or more depth images 106 of the item 102, extract features 158 from each of depth images 106, and add a new entry 130 for each depth image 106 of the item 102 to the training dataset 154. The item tracking engine 144 may identify the new item 102 by comparing a captured depth image 106 and depth images 106 stored in the training dataset 154, similar to that described above.

Example Imaging Device

FIG. 2 illustrates a perspective view of an embodiment of an imaging device 120. In this example, the imaging device 120 comprises a plurality of cameras 122, a plurality of 3D sensors 124, a weight sensor 126, a platform 128, and a frame structure 210. The imaging device 120 may be configured as shown in FIG. 2 or in any other suitable configuration. In some embodiments, the imaging device 120 may further comprise additional components, including, but not limited to, light, displays, and graphical user interfaces.

The platform 128 comprises a surface 212 that is configured to hold a plurality of items 102. In some embodiments, the weight sensor 126 may be a distinct device from the imaging device 126. In some embodiments, the platform 128 may be integrated with the weight sensor 126. For example, the platform 128 may be positioned on the weight sensor 126 which allows the weight sensor 126 to measure the weight of items 102 that are placed on the platform 128. As another example, the weight sensor 126 may be disposed within the platform 128 (such that the weight sensor 126 is integrated with the platform 128) to measure the weight of items 102 that are placed on the platform 128. In some embodiments, at least a portion of the surface 212 may be transparent. In this case, a camera 122 or scanner (e.g., a barcode scanner, a QR code scanner) may be disposed below the surface 212 of the platform 218 and configured to capture images 104 or scan the bottoms of items 102 placed on the platform 128. For instance, a camera 122 or scanner may be configured to identify and read product labels, barcodes, and/or QR codes of items 102 through the transparent surface 212 of the platform 128. The platform 128 may be formed of aluminum, metal, wood, plastic, glass, or any other suitable material.

The frame structure 210 may comprise a set of rails that are assembled to hold the cameras 122 and 3D sensors 124. The frame structure 210 is generally configured to support and position cameras 122 and 3D sensors 124. In the example of FIG. 2, the frame structure 210 is configured to position cameras 122a and 122b on one side of the platform 128, a camera 122c on another side of the platform 128, and cameras 122d and 122e on another side of the platform 128. The cameras 122a to 122e have perspective views of the platform 128. The cameras 122a to 122e are configured to capture side or perspective images 104 of items 102 placed on the platform 128. An example of a perspective image 104 of an item 102 is illustrated in FIG. 3B.

In some embodiments, the frame structure 128 may further comprise one or more other cameras 122 (not shown) positioned on one or more other sides of the platform 128. The frame structure 210 may be configured to use any number and combination of cameras 122a to 122e. For example, one or more of the identified cameras 122 may be optional and omitted.

The frame structure 210 is further configured to position a camera 122f above the platform 128. The cameras 122f may be configured to capture top-view images 104 of the platform 128. In some embodiments, the frame structure 210 may further comprise one or more other cameras 122 (not shown) above the platform 128 to capture top-view images 104 of items 102 placed on the platform 128.

Similarly, the frame structure 210 may comprise 3D sensors 124a to 124f positioned on sides and above of the platform 128 as illustrated in FIG. 2. In the example of FIG. 2, the frame structure 210 is configured to position 3D sensors 124a and 124b on one side of the platform 128, a 3D sensor 124c on another side of the platform 128, and 3D sensors 124d and 124e on another side of the platform 128. A 3D sensor 124 may be integrated with a camera 122 or be separate.

Each of the 3D sensors 124a to 124e is configured to capture side depth images 106 of items 102 placed on the platform 128. The 3D sensor 124f may be configured to capture top-view depth image 106 of items 102 placed on the platform 128.

Each of a perspective image 104 and a perspective depth image 106 is configured to capture the side-facing surfaces of items 102 placed on the platform 128. An example of a top-view depth image 106 of an item 102 is described in conjunction with FIGS. 3A and 3B. Each of a top-view or overhead image 104 or depth image 106 is configured to capture upward-facing surfaces of items 102 placed on the platform 128. An example of a perspective image 104 of an item 102 is described in conjunction with FIG. 3B.

In other examples, the frame structure 210 may be configured to support and position any other suitable number and combination of cameras 122 and 3D sensors 124 on any position with respect to the platform 128. The frame structure 210 may be formed of aluminum, metal, wood, plastic, or any other suitable material.

Additional details of the imaging device 120 are disclosed in U.S. patent Ser. No. 17/362,261 entitled, "ITEM IDENTIFICATION USING DIGITAL IMAGE PROCESSING" which is hereby incorporated by reference herein as if reproduced in its entirety.

FIGS. 3A and 3B illustrate example top-view depth images 106 of the platform 128 before and after an item 102 is placed on the platform 128. FIG. 3A illustrates a top-view depth image 106a of the platform 128 captured by the 3D sensor 124f (see FIG. 2) before an item 102 is placed on the platform 128.

The depth image 106a shows a substantially constant point cloud indicating that there are no items 102 on the platform 128. Substantially constant point cloud means that there no, minimal, or less than a threshold difference between values that represent colors of the cloud of points in the depth image 106a. The depth image 106a corresponds to a reference depth image 106 that is captured with no items 102 are placed on the platform 128. The item tracking engine 144 may use the reference depth image 106 to compare with subsequent depth images 106 and determine whether an item 102 is placed on the platform 128.

FIG. 3A illustrates a top-view depth image 106b of the platform 128 captured by the 3D sensor 124f (see FIG. 2) after an item 102 is placed on the platform 128. In this example, the colors or pixel values within the depth images 106 represent different depth values. In depth image 106b, the different depth values correspond with the item 102 that is placed on the platform 128.

FIG. 3B illustrates an example perspective image 104 of an item 102 detected on the platform 128. The image 104 may be captured by any of the cameras 122 described in FIG. 2. The item tracking engine 144 may implement a neural network, e.g., the machine learning algorithm 156 to crop the image 104 such that the background of the image 104 is suppressed or minimized. This process is described in detail further below in conjunction with the operational flow 1400 described in FIG. 14.

FIG. 4 illustrates an example embodiment of the training dataset 154. Aspects of the training dataset 154 are described in FIG. 1, and additional aspects are described below. In the example of FIG. 4, assume that an item 102a is placed on the platform 128 of the imaging device 120. The imaging device 120 capture images 104 of the item 102a using the cameras 122. The imaging device 120 sends the images 104 to the server 140 for processing. The item tracking engine 144 implements the machine learning algorithm 156 to extract features 158 from each image 104. An image 104 captured from each camera 122 may be added in a new entry 130 in the training dataset 154. In the example of FIG. 4, the item tracking engine 144 extracts features 158a-1 from the image 104a-1. The features 158a-1 may be represented by the feature vector 134a-1 that comprises a set of numerical values. The item tracking engine 144 extracts features 158a-2 from the image 104a-2. The features 158a-2 may be represented by the feature vector 134a-2 that comprises a set of numerical values. The item tracking engine 144 extracts features 158a-n from the image 104a-n. The features 158a-n may be represented by the feature vector 134a-n that comprises a set of numerical values. Each image 104 may be labeled or associated with one or more annotations 136, similar to that described in FIG. 1.

Example Method for Adding Items to the Training Dataset of an Item Identification Model FIG. 5 illustrates an example flowchart of a method 500 for adding items 102 to the training dataset 154 of an item identification model 152. Modifications, additions, or omissions may be made to method 500. Method 500 may include more, fewer, or other operations. For example, operations may be performed in parallel or in any suitable order. While at times discussed as the system 100, processor 142, item tracking engine 144, imaging device 120 or components of any of thereof performing operations, any suitable system or components of the system may perform one or more operations of the method 500. For example, one or more operations of method 500 may be implemented, at least in part, in the form of software instructions 150 of FIG. 1, stored on non-transitory, tangible, machine-readable media (e.g., memory 148 of FIG. 1) that when run by one or more processors (e.g., processor 142 of FIG. 1) may cause the one or more processors to perform operations 502-514.

Method 500 may begin at 502 where the item tracking engine 144 may determine that an item 102 is not included in the training dataset 154 of the item identification model 152. For example, the item tracking engine 144 may determine that the item 102 is not included in the training dataset 154 if it is determined that no images 104 of the item 102 are included in the training dataset 154, similar to that described in FIG. 1.

At 502, the item tracking engine 144 obtains an identifier 132 associated with the item 102. For example, the item tracking engine 144 may obtain a scan of a barcode of the item 102, similar to that described in FIG. 1.

At 504, the item tracking engine 144 determines whether a triggering event 108 is detected. The triggering event 108 may correspond to a user placing the item 102 on the platform 128. Various embodiments of determining whether a triggering event 108 is detected are described in FIG. 1. If the item tracking engine 144 determines that the triggering event 108 is detected, method 500 proceeds to 508. Otherwise, method 500 remains at 506 until it is determined that the triggering event 108 is detected.

At 508, the imaging device 120 captures images 104 of the item 102, e.g., using the cameras 122. For example, the item tracking engine 144 may send a signal to the imaging device 120 to capture images 104 of the item 102. The imaging device 120 may send the images 104 to the server 140.

At 510, the item tracking engine 144 extracts a set of features 158 associated with the item 102 from the images 104. In this process, the item tracking engine 144 may feed each image 104 to the machine learning algorithm 156 to extract features 158 associated with the item 102, similar to that described in FIG. 1. Similarly, the item tracking engine 144 may extract the set of features 158 from depth images 106 of the item 102.

At 512, the item tracking engine 144 associates the item 102 to the identifier 132 and the set of features 158.

At 514, the item tracking engine 144 adds a new entry 130 for the item 102 to the training dataset 154.

In certain embodiments, the item tracking engine 144 may be configured to remove an item 102 from the training dataset 154. For example, if an item 102 is removed from a physical store, the item 102 may be removed from the training dataset 154.

Example System for Capturing Images for Training an Item Identification Model

Figure 6:
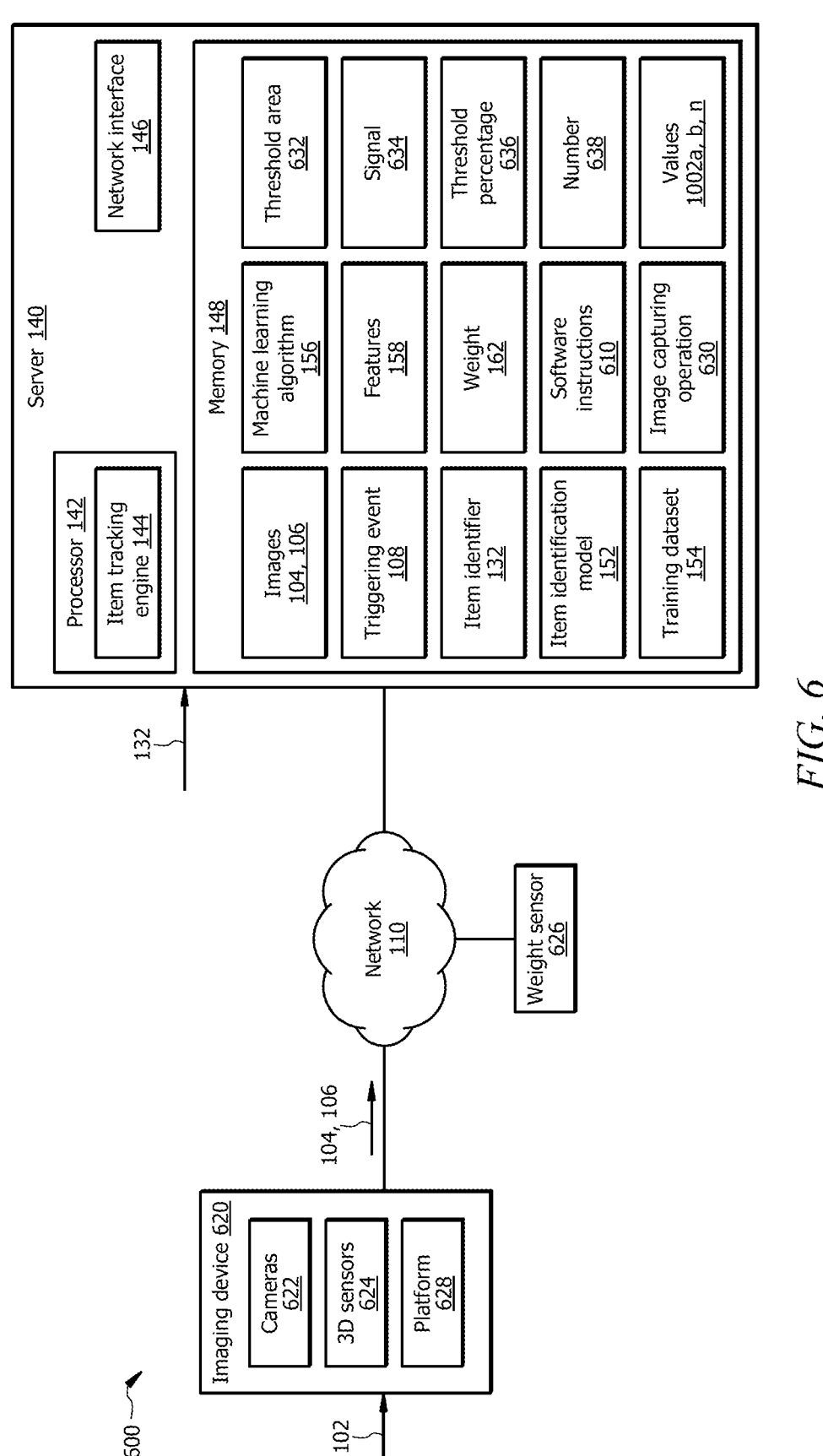
FIG. 6 illustrates one embodiment of a system that is configured to capture images for training an item identification model.

FIG. 6 illustrates one embodiment of a system 600 that is configured to capture images 104 and/or depth images 106 for training an item identification model 152. In one embodiment, system 600 comprises the server 140. In some embodiments, system 600 further comprises the network 110, an imaging device 620, and a weight sensor 626. In other embodiments, system 600 may not have all of the components listed and/or may have other elements instead of, or in addition to, those listed above. Aspects of certain components of the system 600 are described above in FIGS. 1-5, and additional aspects are described below. The network 110 enabled communication between components of the system 600. Server 140 comprises the processor 142 in signal communication with the memory 148. Memory 148 stores software instructions 610 that when executed by the processor 142, cause the processor 142 to perform one or more functions described herein. For example, when the software instructions 610 are executed, the processor 142 executes the item tracking engine 144 to detect one or more items 102 placed on the platform 628, and add a new entry for each detected item 102 to the training dataset 154. This operation is described further below in conjunction with an operational flow of the system 600 and method 900 described in FIG. 9.

The system 600 may further be configured to aggregate corresponding features 158 of an item 102 extracted from different images 104 of the item 102 and add the aggregated value for the feature 158 to a training dataset 154 of the item identification model 152. The system 600 may perform a similar operation for each corresponding feature 158 such as: 1) one or more dominant colors of an item 102; 2) a dimension of an item 102; 3) a weight of an item 102; and 4) any other feature 158 of an item 102 described in FIG. 1. This operation is described further below in conjunction with an operational flow 1000 of the system 600 described in FIG. and method 1100 described in FIG. 11.

System Components

Example Imaging Device

Imaging device 620 is generally configured to capture images 104 and depth images 106 of items 102 that are placed on the platform 628 of the imaging device 620. In one embodiment, the imaging device 620 comprises one or more cameras 622, one or more 3D sensors 624, and a platform 628. Example embodiments of hardware configurations of the imaging device 620 are described in FIGS. 7 and 8.

In certain embodiments, each of the cameras 622 and 3D sensors 624 may correspond to and/or be an instance of camera 122 and 3D sensor 124 described in FIG. 1, respectively.

The platform 628 comprises a surface on which items 102 can be placed. In certain embodiments, the platform 628 may comprise a surface that is configured to rotate, such as a turntable.

In certain embodiments, the imaging device 620 may further include a weight sensor 626. The weight sensor 626 may be integrated within the platform 628, similar to that described in FIGS. 1 and 2 with respect to the weight sensor 126. In certain embodiments, the weight sensor 626 may be a distinct device from the imaging device 620. The weight sensor 626 may correspond to and/or be an instance of the weight sensor 126 described in FIGS. 1 and 2.

In an embodiment where the weight sensor 626 is distinct from the imaging device 620, the weight sensor 626 may be placed underneath a board, platform, or a surface where items 102 can be placed.

The items 102 can be weighted by the weight sensor 626. The weight sensor 626 is configured to detect a weight 162 of an item 102. The weight sensor 626 sends the detected weight 162 to the server 140.

Aspects of the server 140 are described in FIG. 1, and additional aspects are described below. The memory 148 is further configured to store the software instructions 610, images 104, depth images 106, item identification model 152, training dataset 154, identifier 132, features 158, machine learning algorithm 156, image capturing operation 630, triggering event 108, weights 162, threshold area 632, signal 634, values 1002*a*, 1002*b*, and 1002*n*, threshold percentage 636, and particular number 638. The particular number 638 may represent a number of degrees, such as two, five, ten, or any other number.

Operational Flow for Capturing Images for Training an Item Identification Model

In an example operation, the operational flow of system 600 may include operations to capture one or more images 104 and/or depth images 106 of an item 102 for training the item identification model 152.

In one embodiment, the operational flow of system 600 may begin when the item tracking engine 144 obtains an identifier 132 associated with the item 102. The identifier 132 associated with the item 102 may include a barcode, a QR code, a product label of the item 102. For example, the item tracking engine 144 may obtain the identifier 132 of the item 102 when a user scans the barcode of the item 102 by using a barcode scanner, similar to that described in FIG. 1.

The item tracking engine 144 may detect a triggering event 108 at the platform 628. The triggering event 108 may correspond to a user placing the item 102 on the platform 628. Various embodiments of detecting the triggering event 108 are described above in FIG. 1.

Capturing Image(s) of the Item

Figure 7:
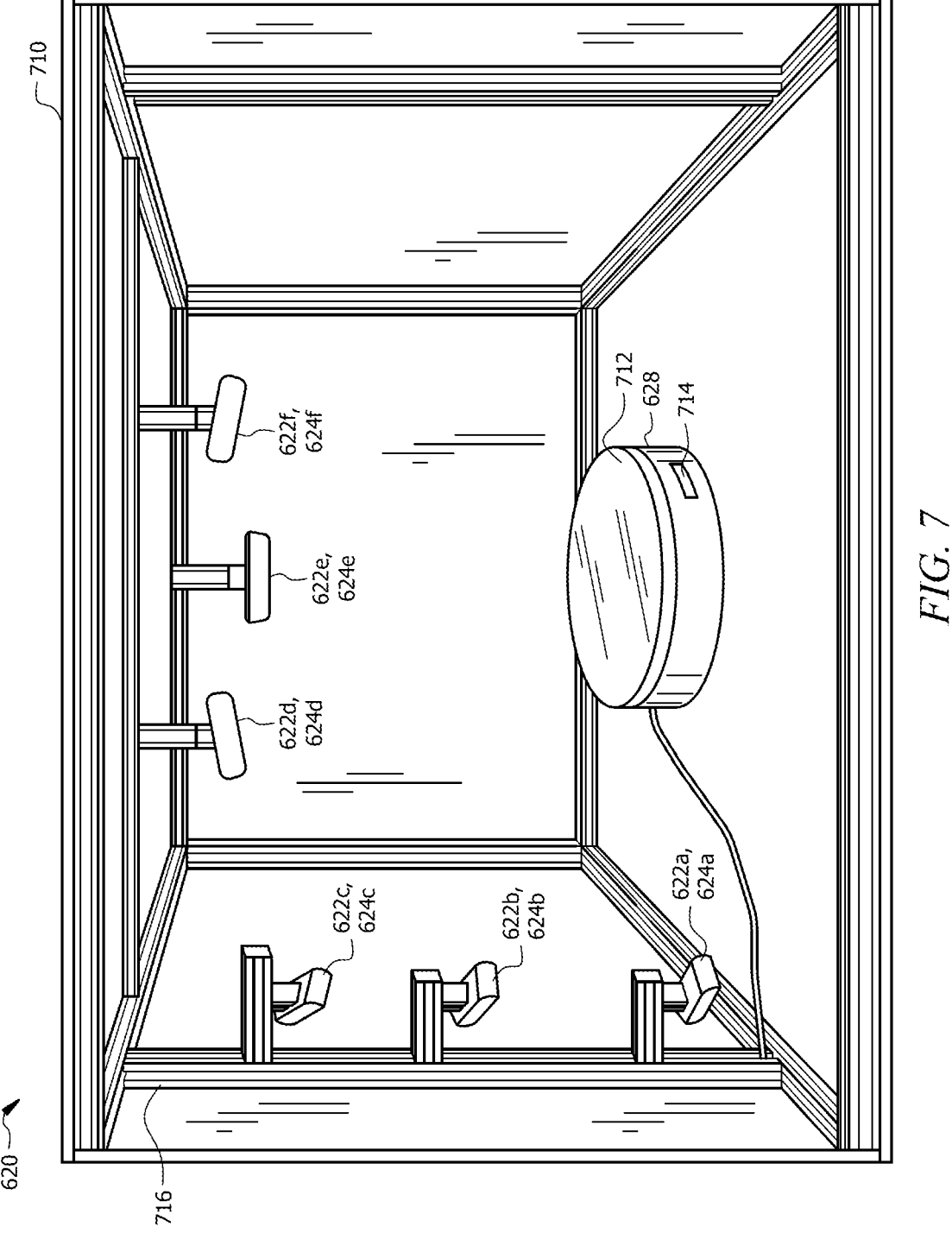
FIG. 7 illustrates a perspective view of a second embodiment of an imaging device for use in conjunction with the system of FIG. 6.

The item tracking engine 144 may execute an image capturing operation 630 to capture image(s) 104 and/or depth image(s) 106 of the item 102. In this operation, the item tracking engine 144 may cause the platform 628 to rotate (as illustrated in FIG. 7).

For example, by executing the image capturing operation 630, the item tracking engine 144 may send a signal 634 to the imaging device 620, where the signal 634 includes instructions to rotate the platform 628. In one embodiment, the platform 628 may rotate in an x-y plane. In certain embodiments, the platform 628 may rotate one degree at a time until the platform 628 is fully rotated once.

Further, by executing the image capturing operation 630, a signal may be sent to cameras 622 to capture images 104 of the item 102 while the platform 628 is rotating.

In one embodiment, each camera 622 may capture one image 104 of the item 102 at each degree of rotation of the platform 628. For example, at degree=0, each camera 622 may capture one image 104 of the item 102; at degree=1, each camera 622 may capture one image 104 of the item 102; and so on until one full turn of the platform 628. Thus, in one embodiments, each camera 622 may capture three hundred sixty images 104 of the item 102.

In another embodiment, each camera 622 may capture one image 104 of the item 102 at each plurality of degrees of rotation of the platform 628, e.g., every two degrees, every five degrees, or any suitable number of degrees. In certain embodiments, one or more captured images 104 may be optional and omitted.

In one embodiment, the platform 628 may rotate a particular number of degrees at a time. The particular number 638 of degrees may be two, five, ten, or any other number. In one embodiment, one or more cameras 622 may not be triggered to capture an image 104 of the item 102.

The item tracking engine 144 may perform a similar operation for 3D sensors 624. Thus, the image capturing operation 630 may include capturing depth images 106 of the item 102 while the platform 628 is rotating.

For example, by executing the image capturing operation 630, a signal may be sent to 3D sensors 624 to capture depth images 106 of the item 102 while the platform 628 is rotating.

Each 3D sensor 624 may capture one depth image 106 of the item 102 at each degree of the rotation of the platform 628.

Thus, in one embodiment, each 3D sensor 624 may capture three hundred sixty depth images 106 of the item 102. In another embodiment, each 3D sensor 624 may capture one depth image 106 of the item 102 at each plurality of degrees of rotation of the platform 628, e.g., every two degrees, every five degrees, or any suitable number of degrees. In certain embodiments, one or more captured depth images 106 may be optional and omitted.

Determining an Orientation of the Item

In one embodiment, the item tracking engine 144 may be configured to determine an orientation of the item 102 with respect to the platform 628.

In this process, the item tracking engine 144 may cause a 3D sensor 624 to capture a depth image 106 of the item 102 while the platform 628 is turning, similar to that described above. For example, the item tracking engine 144 may cause the 3D sensor 624*f* (see FIG. 7) to capture an overhead depth image 106 of the item 102. The overhead depth image 106 may be configured to capture upward-facing surfaces of the item 102 on the platform 628. The 3D sensor 624 may capture the depth image 106 of the item 102. The imaging device 620 may send the depth image 106 to the server 140 for processing.

The item tracking engine 144 may determine an orientation of the item 102 with respect to the platform 628 based on the depth image 106, as described below.

The orientation of the item 102 may be vertical or horizontal with respect to the platform 628. For example, the item tracking engine 144 may determine whether the item 102 is positioned in a vertical orientation (e.g., standing position) or in a horizontal orientation with respect to the platform 628. In the vertical orientation, features 158 of an item 102 are primarily in the vertical orientation. In the horizontal orientation, features 158 of an item 102 are primarily in the horizontal orientation. Thus, cameras 622 with top-views of the platform 628 may be better suited for capturing images 104 of the item 102.

If the item tracking engine 144 determines that the item 102 is positioned in a horizontal orientation with respect to the platform 628, the item tracking engine 144 may determine that the orientation of the item 102 is longitudinal with respect to the platform 628. In response, the item tracking engine 144 may cause a subset of cameras 622 that are on top of the platform 628 to capture overhead images 104 of the item 102 on the platform 628.

In one embodiment, the item tracking engine 144 may determine the orientation of an item 102 based on a pose of the item detected from the depth image 106, e.g., standing or laid down.

The item tracking engine 144 may use an area of the item 102 to determine the orientation of the item 102. Referring to FIG. 3A as an example, the item tracking engine 144 may determine the area 302 of the item 102. The item tracking engine 144 may compare the determined area 302 with a threshold area 632 (see FIG. 6). The item tracking engine 144 may determine that the item 102 is in vertical orientation if it is determined that the determined area 302 is less than or equal to the threshold area 632 (see FIG. 6). Otherwise, the item tracking engine 144 may determine that the item 102 is in a horizontal orientation when the determined area 302 is more than the threshold area 632 (see FIG. 6). In the example of FIG. 3A, the item tracking engine 144 determines that the item 102 is in vertical orientation because the area 302 is less than the threshold area 632 (see FIG. 6).

Extracting Features of the Item from Each Image and Adding a New Entry for Each Image Referring back to FIG. 6, The item tracking engine 144 may extract a set of features 158 from each image 104 of the item 102, where each feature 158 corresponds to a physical attribute of the item 102, similar to that described in FIG. 1. The item tracking engine 144 associates the item 102 to the identifier 132 and the set of features 158. The item tracking engine 144 adds a new entry 130 to the training dataset 154, where the new entry 130 may represent the item 102 labeled with the identifier 132 and the set of features 158.

In some embodiments, the item 102 in the new entry 130 may further be labeled with a feature vector 134 and/or annotations 136, similar to that described in FIG. 1.

In one embodiment, the item tracking engine 144 may be configured to associate the item 102 with a weight 162. In this operation, the item tracking engine 144 may receive a plurality of weights 162 of multiple instances of the item 102. For example, multiple instances of the item 102 may be placed on the weight sensor 626 and weighed by the weight sensor 626. The item tracking engine 144 may determine a mean of the weights 162 of the multiple instances of the item 102. The item tracking engine 144 may associate the mean of the weights 162 of the multiple instances of the item 102 to the item 102. The item tracking engine 144 may add the mean of the weights 162 of the item 102 to the new entry 130 in the training dataset 154, e.g., in the annotations 136.

Example Imaging Device

FIG. 7 illustrates a perspective view of an embodiment of an imaging device 620. In this example, the imaging device 620 comprises a plurality of cameras 622, a plurality of 3D sensors 624, a platform 628, and a frame structure 710. The imaging device 620 may be configured as shown in FIG. 7, or in any other suitable configuration. In some embodiments, the imaging device 620 may further comprise additional components, including, but not limited to, light, displays, and graphical user interfaces.

The platform 628 comprises a surface 712 that is configured to hold one or more items 102. In some embodiments, the platform 628 may be configured to rotate. For example, the platform 628 may rotate in an x-y plane around the z-axis at its center point. The platform 628 may be operably coupled to a circuit board 714. The circuit board 714 may comprise a hardware processor (e.g., a microprocessor) in signal communication with a memory, and/or circuitry (not shown) configured to perform any of the functions or actions of the circuit board 714 described herein. For example, the circuit board 714 may be configured to rotate the platform 628 in response to receiving a signal 634 (see FIG. 6) from the item tracking engine 144. The circuit board 714 may be communicatively coupled to the server 140, for example, wirelessly (e.g., via WiFi, Bluetooth, other wireless communication protocols) and/or through wires. The platform 628 may receive a signal 634 (see FIG. 6) from the item tracking engine 144, where the signal 634 may include electrical signals to cause the platform 628 to rotate.

In one embodiment, the platform 628 may rotate one degree at a time until the platform 628 is fully rotated once. In one embodiment, at least one camera 622 may be triggered to capture one image 104 of the item 102 on the platform 628 at each degree of rotation of the platform 628.

In another embodiment, the platform 628 may rotate a particular number 638 of degrees at a time, e.g., every two degrees, every five degrees, or any other suitable number of degrees. In one embodiment, at least one camera 622 may be triggered to capture one image 104 of the item 102 on the platform 628 at each of a plurality of degrees of rotation of the platform 628, e.g., every two degrees, every five degrees, or any other suitable number of degrees, similar to that described in FIG. 6.

In one embodiment, at least one 3D sensor 624 may be triggered to capture one depth image 106 of the item 102 on the platform 628 at each degree of rotation of the platform 628.

In another embodiment, at least one 3D sensor 624 may be triggered to capture one depth image 106 of the item 102 on the platform 628 at each of a plurality of degrees of rotation of the platform 628, e.g., every two degrees, every five degrees, or any other suitable number of degrees, similar to that described in FIG. 6.

In some embodiments, at least a portion of the surface 712 may be transparent. In this case, a camera 622 may be disposed below the surface 712 of the platform 628 and configured to capture images 104 of the bottom(s) of item(s) on the platform 628. Similarly, a scanner (e.g., a barcode scanner, a QR code scanner) may be disposed below the surface 712 of the platform 628 and configured to scan the bottom(s) of the item(s) 102 on the platform 628. For instance, a camera 622 and/or scanner may be configured to identify and read product labels, barcodes, and/or QR codes of items 102 through the transparent surface 712 of the platform 628. The platform 628 may be formed of aluminum, metal, wood, plastic, glass, or any other suitable material.

The frame 710 may comprise a set of rails that are assembled to hold the cameras 622 and 3D sensors 624. The frame 710 is generally configured to support and position cameras 622 and 3D sensors 624. In the example of FIG. 7, the frame structure 710 is configured to position cameras 622a to 622f.

A first subset of cameras 622 may be positioned at one or more heights with respect to the platform 628 on a side of the platform 628. In the example of FIG. 7, cameras 622a to 622c are positioned at three different heights with respect to the platform 628. The cameras 622a to 622c are arranged vertically on a rail 716. The rail 716 is on a side of the platform 628 adjacent to the platform 628. The cameras 622a to 622c have perspective views of the platform 628. Thus, the cameras 622a to 622c are configured to capture perspective images 104 of item 102 placed on the platform 628. In some embodiments, any number of cameras 622 may be placed on one or more rails 716.

A second subset of cameras 622 may be positioned above the platform 628. In the example of FIG. 7, cameras 622d to 622f are positioned above the platform 628. The cameras 622d to 622f are arranged to form a triangle.

The cameras 622d to 622f have top-views of the platform 628. Thus, the cameras 622d to 622f are configured to capture overhead images 104 of item 102 placed on the platform 628. In some embodiments, any number and/or combination of cameras 622 may be positioned above the platform 628.

The frame structure 710 may be configured to position 3D sensors 624. In certain embodiments, any number and/or any combination of cameras 622 may be integrated with a 3D sensor 624. In certain embodiments, a camera 622 and a 3D sensor 624 may be distinct devices.

In certain embodiments, the frame structure 710 may be configured to position 3D sensors 624a to 624f. A first subset of 3D sensors 624 may be positioned at one or more heights with respect to the platform 628 on a side of the platform 628.

The first subset of 3D sensors 624 may have perspective views of the platform 628. Thus, the first subset of 3D sensors 624 may be configured to capture perspective depth images 106 of item 102 placed on the platform 628. In some embodiments, any number of 3D sensors 624 may be placed on one or more rail 716.

A second subset of 3D sensors 624 may be positioned above the platform 628. In the example of FIG. 7, 3D sensors 624d to 624f may be positioned above the platform 628. The second subset of 3D sensors 624 is arranged to form a triangle. The second subset of 3D sensors 624 have top-views of the platform 628. Thus, the second subset of 3D sensors 624 may be configured to capture overhead depth images 106 of item 102 placed on the platform 628. In some embodiments, any number and/or combination of 3D sensors 624 may be positioned above the platform 628.

In other examples, the frame structure 710 may be configured to support and position any other suitable number and combination of cameras 622 and 3D sensors 624. The frame structure 710 may be formed of aluminum, metal, wood, plastic, or any other suitable material.

Figure 8:
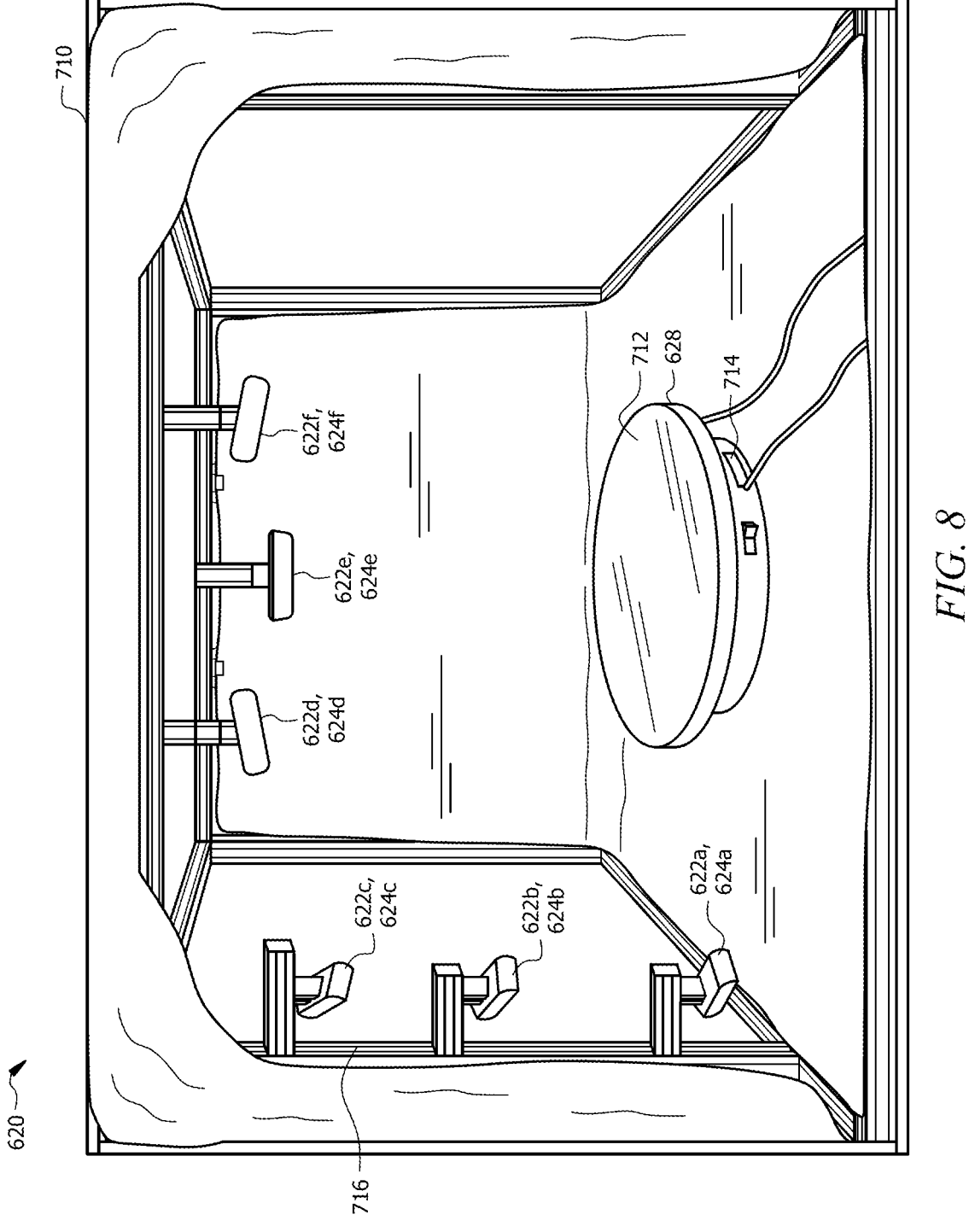
FIG. 8 illustrates a perspective view of a third embodiment of an imaging device with an enclosure for use in conjunction with the system of FIG. 6.

FIG. 8 illustrates a perspective view of another embodiment of an imaging device 620 with an enclosure 810. In this configuration, the enclosure 810 is configured to at least partially encapsulate the frame structure 710, the cameras 622, the 3D sensors 624, and the platform 628 of the imaging device 620. The frame structure 710, the cameras 622, the 3D sensors 624, and the platform 628 may be similar to that described in FIGS. 6 and 7.

In some embodiments, the enclosure 810 may be formed from a cloth material, a fabric, plastic alloys, and/or any other suitable material. The enclosure 810 is configured to provide a lighting condition for the interior of the imaging device 620 that is more than a threshold lighting condition quality. For example, the enclosure 810 may provide a brightness that is more than a threshold brightness level.

Example Method for Capturing Images for Training an Item Identification Model

Figure 9:
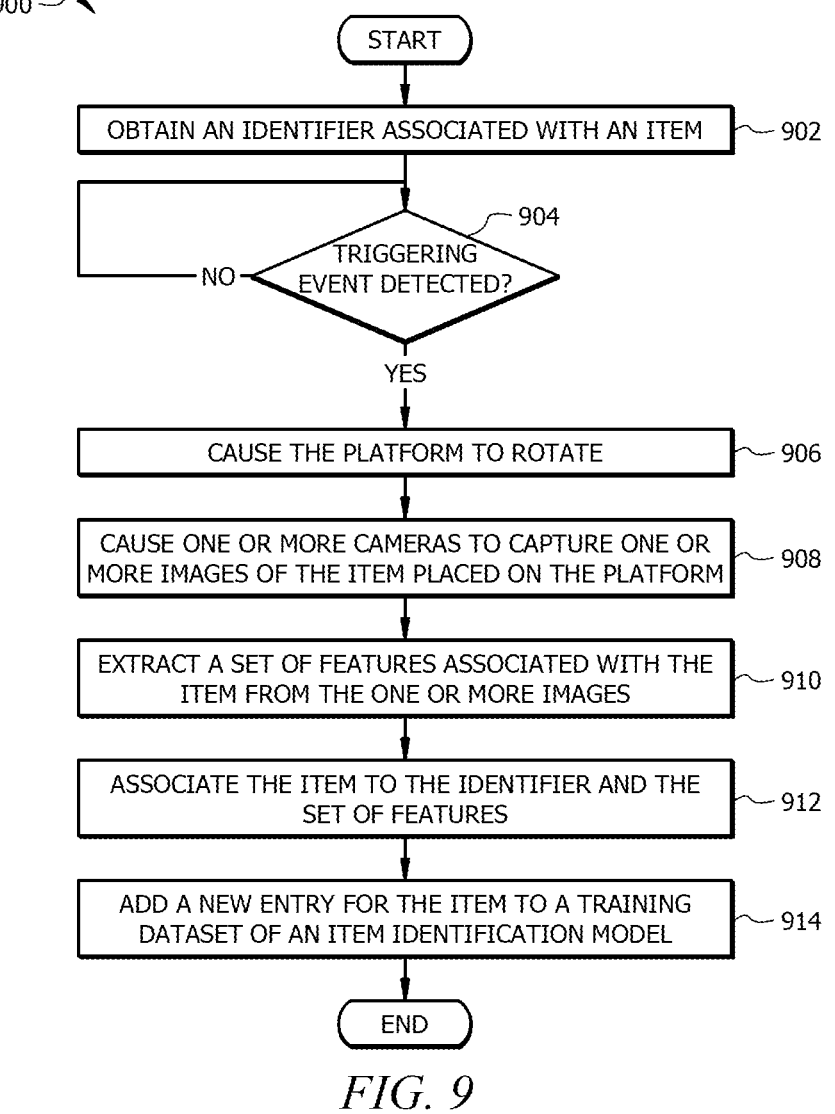
FIG. 9 illustrates an example flowchart of a method for capturing images for training an item identification model for use in conjunction with the system of FIG. 6.

FIG. 9 illustrates an example flowchart of a method 900 for capturing images 104 and/or depth images 106 for training an item identification model 152. Modifications, additions, or omissions may be made to method 900. Method 900 may include more, fewer, or other operations. For example, operations may be performed in parallel or in any suitable order. While at times discussed as the system 600, processor 142, item tracking engine 144, imaging device 620 or components of any of thereof performing operations, any suitable system or components of the system may perform one or more operations of the method 900. For example, one or more operations of method 900 may be implemented, at least in part, in the form of software instructions 610 of FIG. 6, stored on non-transitory, tangible, machine-readable media (e.g., memory 148 of FIG. 6) that when run by one or more processors (e.g., processor 142 of FIG. 6) may cause the one or more processors to perform operations 902-914.

Method 900 begins at 902 where the item tracking engine 144 obtains an identifier 132 associated with the item 102.

For example, the item tracking engine 144 may obtain a scan of a barcode of the item 102, similar to that described in FIGS. 1 and 6.

At 904, the item tracking engine 144 determines whether a triggering event 108 is detected. The triggering event 108 may correspond to a user placing the item 102 on the platform 128. Various embodiments of determining whether a triggering event 108 is detected are described in FIGS. 1 and 6. If the item tracking engine 144 determines that the triggering event 108 is detected, method 900 proceeds to 906. Otherwise, method 900 remains at 904 until it is determined that the triggering event 108 is detected.

At 906, the item tracking engine 144 causes the platform 628 to rotate. For example, the item tracking engine 144 may transmit a signal 634 to the circuit board 714 of the platform 628, where the signal 634 includes electrical signals to rotate the platform 628, similar to that described in FIGS. 6 and 7. In one example, the signal 634 may include instructions to rotate the platform 628 one degree at a time. In response, the platform 628 may rotate one degree at a time until one full rotation. In another example, the signal 634 may include instructions to rotate the platform 628 a particular number 638 of degrees at a time, e.g., every two degrees, every five degree, or any other suitable number of degrees. In response, the platform 628 may rotate the particular number 638 of degrees at a time until one full rotation.

At 908, the item tracking engine 144 causes one or more cameras 622 to capture one or more images 104 of the item 102 placed on the platform 628. In one example, one or more cameras 622 may be triggered to capture one image 104 of the item 102 on the platform 628 at each degree of the rotation of the platform 628, based on the instructions included in the signal 634. Similarly, one or more 3D sensors 624 may be triggered to capture one depth image 106 of the item on the platform 628 at each degree of the rotation of the platform 628. In another example, one or more cameras 622 may be triggered to capture one image 104 of the item 102 on the platform 628 at each of a plurality of degrees of rotation of the platform 628 based on the instructions included in the signal 634. Similarly, one or more 3D sensors 624 may be triggered to capture one depth image 106 of the item on the platform 628 at each of the plurality of degrees of rotation of the platform 628.

At 910, the item tracking engine 144 extracts a set of features 158 associated with the item 102 from the one or more images 104. For example, the item tracking engine 144 may feed the one or more images 104 to the machine learning algorithm 158 to extract the set of features 158 of the item 102, similar to that described in FIGS. 1 to 5. Similarly, the item tracking engine 144 may extract the set of features 158 from depth images 106 of the item 102. Examples of the set of features 158 are described in FIGS. 1 to 5.

At 912, the item tracking engine 144 adds a new entry 130 for the item 102 to the training dataset 154 of the item identification model 152. The new entry 130 may be used to later identify the item 102, similar to that described in FIGS. 1 to 5.

Operational Flow for Identifying Items Based on Aggregated Metadata

Figure 10:
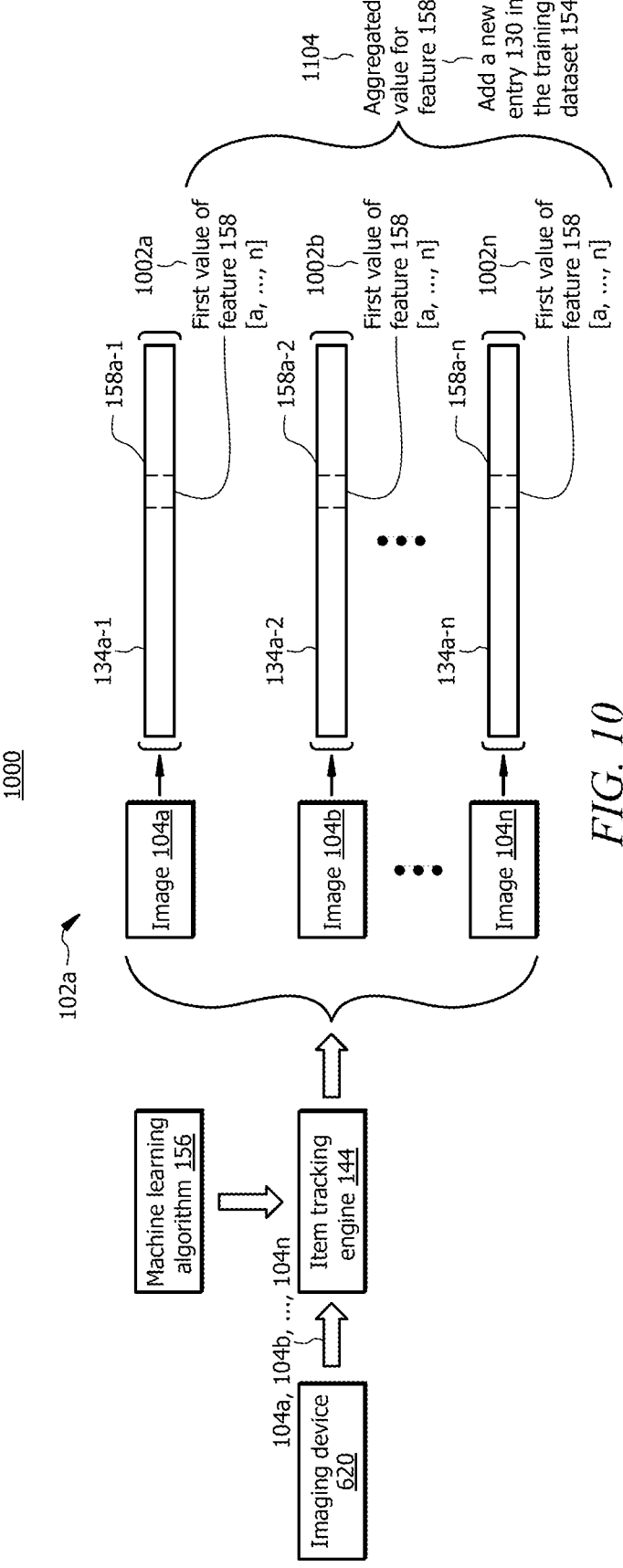
FIG. 10 illustrates an example of an operational flow of the system of FIG. 6 for identifying items based on aggregated metadata.

FIG. 10 illustrates an example of an operational flow 1000 of the system 600 of FIG. 6 for identifying items 102 based on aggregated metadata. As discussed in FIG. 6, system 600 may be configured to identify items 102 based on aggregated metadata. The aggregated metadata may include aggregated features 158 captured from different images 104 of an item 102 placed on the platform 628.

As described in FIGS. 6 to 9, multiple images 104 may be captured of the item 102 placed on the platform 628 while the platform 628 is rotating. Each image 104 of the item 102 may be from a different angle and show a different side of the item 102. Thus, the item tracking engine 144 may extract a different set of features 158 from each image 104 of the item 102.

Thus, system 600 may be configured to aggregate features 158 from the different sets of features 158 to produce a more accurate representation and description of the item 102. This operation is described below in conjunction with the operational flow 1000 of the system 600 described in FIG. 6 and method 1100 described in FIG. 11.

The operational flow 1000 begins when the item tracking engine 144 obtains a plurality of images 104 of an item 102 (e.g., item 102*a*).

Extracting a Set of Features from Each Image of the Item

The item tracking engine 144 may obtain the plurality of images 104 of the item 102*a* from the imaging device 520. In the example of FIG. 10, the item tracking engine 144 obtains images 104*a*, 104*b*, 104*n*, among other images 104 of the item 102*a*.

The item tracking engine 144 may feed each image 104 of the item 102*a* to the machine learning algorithm 156 to extract a set of features 158 associated with the item 102*a* from the image 104. For example, the item tracking engine 144 may extract a first set of features 158*a*-1 from the first image 104*a* of the item 102*a*, where the first set of features 158*a*-1 may be represented by a first feature vector 134*a*-1. Similarly, the item tracking engine 144 may extract a second set of features 158*a*-2 from the second image 104*b* of the item 102*b*, where the second set of features 158*a*-2 may be represented by a second feature vector 134*a*-2; and extract an n-th set of features 158*a*-*n* from the n-th image 104*n* of the item 102*a*, where the n-th set of features 158*a*-*n* may be represented by an n-th feature vector 134*a*-*n*.

Aggregating Corresponding Features from Different Feature Vectors

The item tracking engine 144 may perform the following operations for each feature 158 of the item 102*a*. The item tracking engine 144 may identify a first feature 158 of the item 102*a* in each feature vector 134*a*-1, 134*a*-2, and 134*a*-*n*. For example, the first feature 158 of the item 102*a* may be one or more dominant colors, a dimension, a weight, a shape, a logo, or any other feature 158 described in FIG. 1.

The item tracking engine 144 may identify a first value 1002*a* of the first feature 158 of the item 102*a* from the first image 104*a*. The first value 1002*a* of the first feature 158 may be represented by an array of numerical values, such as [a, . . . , n], where "a" and "n" represent numerical values.

Similarly, the item tracking engine 144 may identify a second value 1002*b* of the first feature 158 of the item 102*a* from the second image 104*b*. The second value 1002*b* of the first feature 158 may be represented by an array of numerical values, such as [b, . . . , m], where "b" and "m" represent numerical values.

Similarly, the item tracking engine 144 may identify an n-th value 1002*n* of the first feature 158 of the item 102*a* from the n-th image 104*n*. The n-th value 1002*n* of the first feature 158 of the item 102*a* may be represented by an array of numerical values, such as [c, . . . , o], where "c" and "o" represent numerical values. The item tracking engine 144 may identify other values 1002 of the first feature 158 from other images 104 of the item 102.

The item tracking engine 144 may determine an aggregated value 1004 for the first feature 158 of the item 102*a* by aggregating two or more of the values 1002*a*, 1002*b*, 1002*n*, and other values 1002 of the first feature 158. The item tracking engine 144 may associate the item 102*a* with the aggregated value 1004 for the first feature 158.

The item tracking engine 144 may add a new entry 130 for each image 104 to the training dataset 154 (see FIG. 6), similar to that described in FIGS. 1, 5, 6, and 9. The item tracking engine 144 may add the aggregated value 1004 for the first feature 158 to the new entry 130. The item tracking engine 144 may perform a similar operation for each feature 158 of the item 102*a*.

For example, with respect to a second feature 158 of the item 102*a*, the item tracking engine 144 may identify a first value 1002*a* of the second feature 158 of the item 102*a* in the first feature vector 134*a*-1, a second value 1002*b* of the second feature 158 of the item 102*a* in the second feature vector 134*a*-2, an n-th value 1002*n* of the second feature 158 of the item 102*a* in the n-th feature vector 134*a*-*n*, among other values 1002 of the second feature 158 of the item 102*a* in other feature vectors 134 extracted from other images 104 of the item 102*a*. The item tracking engine 144 may determine an aggregated value 1004 for the second feature 158 by aggregating two or more values 1002 of the second feature 158 of the item 102*a*.

The item tracking engine 144 may add the aggregated value 1004 for the second feature 158 to the new entry 130 in the training dataset 154. This information may be used for identifying the item 102*a*.

The operation of aggregating the values 1002 of a feature 158 may vary depending on the feature 158. Various use cases of aggregating the values 1002 of a feature 158 are described below.

Case where the Feature is One or More Dominant Colors of the Item

In a case where the feature 158 is one or more dominant colors of the item 102*a*, the item tracking engine 144 may perform one or more operations below to aggregate the one or more dominant colors detected from different images 104 of the item 102*a*.

The item tracking engine 144 may identify one or more first dominant colors of the item 102*a* from the first image 104*a* of the item 102*a*. Each dominant color may be determined based on determining a number of pixels (with the dominant color) that is higher than other pixels (with other colors).

In one embodiment, the item tracking engine 144 may identify a particular number 166 of dominant colors, e.g., three, five, or any suitable number of dominant colors, by implementing the machine learning algorithm 156. To this end, the item tracking engine 144 may determine pixel colors that illustrate the item 102*a* in the first image 104*a*, determine percentages of numbers of pixels based on their colors, rank them in descending order, and determine the top particular number 166 of dominant colors, similar to that described in FIG. 1.

The item tracking engine 144 may determine a percentage of a particular dominant color of the item 102*a* in the image 104*a* by determining a ratio of a number of pixels that have the particular dominant color in relation to the total number of pixels illustrating the item 102*a* in the image 104*a*.

In one embodiment, the item tracking engine 144 may identify one or more dominant colors that have percentages of a number of pixels more than a threshold percentage 164, for example, by implementing the machine learning algorithm 156, similar to that described in FIG. 1.

In this process, the item tracking engine 144 may determine pixel colors that illustrate the item 102*a* in the first image 104a, determine percentages of numbers of pixels based on their colors, rank them in descending order, and determine one or more dominant colors of the item 102a that have percentages of a number of pixels more than a threshold percentage 164, e.g., more than 40%, 45%, etc.

The item tracking engine 144 may perform a similar operation for determining one or more dominant colors of the item 102a from the second image 104a, n-th image 104n, and other images 104 of the item 102a.

The item tracking engine 144 may cluster the dominant colors detected in the images 104a, 104b, 104n, and other images 104 of the item 102a. In one embodiment, the item tracking engine 144 may determine the one or more dominant colors of the item 102a by determining which dominant colors from among the dominant colors detected in the images 104 have percentages more than a threshold percentage 636, e.g., more than 40%, 45%, etc.

In an example scenario, assume that the item tracking engine 144 determines one or more first dominant colors of the item 102a from the first image 104a of the item 102a, and one or more second dominant colors of the item 102a from the second image 104b of the item 102a. The item tracking engine 144 may determine which dominant colors from among the one or more first dominant colors and the one or more second dominant colors have percentages more than the threshold percentage 636. The item tracking engine 144 may perform a similar operation for dominant colors detected in other images 104 of the item 102a.

In one embodiment, the item tracking engine 144 may determine a particular number 166 of dominant colors of the item 102a by determining the top particular number of dominant colors from among the dominant colors detected in the images 104.

In this manner, the item tracking engine 144 may determine the one or more overall dominant colors of the item 102a detected in different images 104 of the item 102a by clustering the dominant colors detected in different images 104 of the item 102a. The item tracking engine 144 may associate the one or more detected dominant colors to the item 102a. The item tracking engine 144 may add the one or more detected dominant colors to the new entry 130. This information may be used for identifying the item 102a.

Case where the Feature is a Weight of the Item

In a case where the feature 158 is a weight 162 of the item 102a, the item tracking engine 144 may perform one or more operations below to aggregate multiple weights 162 of multiple instances of the item 102a.

The item tracking engine 144 may receive a plurality of weights 162 of multiple instances of the item 102a. For example, the item tracking engine 144 may receive a plurality of weights 162 of multiple instances of the item 102a when a user places the multiple instances of the item 102a (e.g., five, six, or any number of instances of the item 102a) on the weight sensor 626 (see FIG. 60) and the weight sensor 626 (see FIG. 6) measure the overall weights 162 of the multiple instances of the item 102a.

The weight sensor 626 (see FIG. 6) transmits the measured weights 162 of the multiple instances of the item 102a to the server 140. The item tracking engine 144 may determine a mean of the plurality of weights 162 of the multiple instances of item 102a.

The item tracking engine 144 may associate the mean of the plurality of weights 162 of the multiple instances of the item 102a to the item 102a. The item tracking engine 144 may add the mean of the plurality of weights 162 of the multiple instances of the item 102a to the new entry 130. This information may be used for identifying the item 102a.

Case where the Feature is the Dimension of the Item

In a case where the feature 158 is a dimension of the item 102a, the item tracking engine 144 may perform one or more operations below to aggregate multiple dimensions of the item 102a detected from multiple images 104.

As discussed in FIG. 1, the dimension of the item 102a may be represented by a length, a width, and a height of the item 102a. Since different images 104 of the item 102a show different sides of the item 102a, multiple dimensions of the item 102a may be measured from multiple images 104 of the item 102a. For example, the item tracking engine 144 (e.g., via the machine learning algorithm 156) may measure a first dimension of the item 102a from the first image 104a, a second dimension of the item 102a from the second image 104b, an n-th dimension of the item 102a from the n-th image 104n, and other dimensions of the item 102a from other images 104.

The item tracking engine 144 may determine the dimension of the item 102a by determining a mean of the multiple dimensions of the item 102a measured from multiple images 104 of the item 102a. The item tracking engine 144 may associate the mean of multiple dimensions of the item 102a to the item 102a. The item tracking engine 144 may add the mean of the multiple dimensions of the item 102a to the new entry 130. This information may be used for identifying the item 102a.

Case where the Feature is a Mask Around the Item

In a case where the feature 158 is a mask that defines a contour around the item 102a, the item tracking engine 144 may perform one or more operations below to aggregate masks of the item 102a detected in multiple images 104 of the item 102a.

The item tracking engine 144 may identify multiple masks around the item 102a from multiple images 104 of the item 102a. For example, the item tracking engine 144 may identify a first mask that defines a first contour around the item 102a in the first image 104a, a second mask that defines a second contour around the item 102a, and other masks around the item 102a from other images 104.

The item tracking engine 144 may compare the first mask with the second mask. The item tracking engine 144 may determine differences between the first mask (detected in the first image 104a) and the second mask (detected in the second image 104b).

Based on the determined differences between the first mask and second mask, the item tracking engine 144 may determine at least a portion of a three-dimensional mask around the item 102a.

The item tracking engine 144 may perform a similar operation for every two adjacent images 104. For example, the item tracking engine 144 may determine a first set of differences between the first mask (detected in the first image 104a) and the second mask (detected in the second image 104b); a second set of differences between the second mask (detected in the second image 104b) and a third mask (detected in a third image 104); and so on. The item tracking engine 144 may combine the multiple masks of the item 102a detected from different images 104.

The item tracking engine 144 may determine a three-dimensional mask around the item 102a based on the differences between the multiple masks of the item 102a, and the combined masks of the item 102a. The item tracking engine 144 may associate the three-dimensional mask of the item 102a to the item 102a. The item tracking engine 144 may add the three-dimensional mask of the item 102a to the new entry 130. This information may be used for identifying the item 102a. The item tracking engine 144 may identify the item 102*a* based on the features 158 associated with the item 102*a*, similar to that described in FIG. 1.

In one embodiment, the item tracking engine 144 may determine the three-dimensional mask around the item 102*a* if the item tracking engine 144 fails to identify the item 102*a* using one or more two-dimensional masks. In other words, determining the three-dimensional mask around the item 102*a* is in response to determining that the item 102*a* is not identified based on the two-dimensional mask of the item 102*a*.

Example Method for Identifying Items Based on Aggregated Metadata

FIG. 11 illustrates an example flowchart of a method 1100 for identifying items 102 based on aggregated metadata. Modifications, additions, or omissions may be made to method 1100. Method 1100 may include more, fewer, or other operations. For example, operations may be performed in parallel or in any suitable order. While at times discussed as the system 600, processor 142, item tracking engine 144, imaging device 620, or components of any of thereof performing operations, any suitable system or components of the system may perform one or more operations of the method 1100. For example, one or more operations of method 1100 may be implemented, at least in part, in the form of software instructions 610 of FIG. 6, stored on non-transitory, tangible, machine-readable media (e.g., memory 148 of FIG. 6) that when run by one or more processors (e.g., processor 142 of FIG. 6) may cause the one or more processors to perform operations 1102-1116.

Method 1100 begins at 1102 where the item tracking engine 144 obtains a plurality of images 104 of an item 102. The item tracking engine 144 may obtain the plurality of images 104 of the item 102 from the imaging device 520, similar to that described in FIGS. 6 and 10.

At 1104, the item tracking engine 144 extracts a set of feature 158 associated with the item 102 from each image of the plurality of images 104. For example, the item tracking engine 144 may feed each image 104 to the machine learning algorithm 156 to extract a set of features 158, similar to that described in FIGS. 1 and 10. Similarly, the item tracking engine 144 may extract the set of features 158 from depth images 106 of the item 102, similar to that described in FIGS. 1 and 10. Examples of the set of features 158 are described in FIGS. 1 and 10.

At 1106, the item tracking engine 144 selects a feature 158 from among the set of features 158. The item tracking engine 144 may iteratively select a feature 158 until no feature 158 is left for evaluation.

At 1108, the item tracking engine 144 identifies a plurality of values 1002 that represent the feature 158 from each image 104 of the item 102. For example, the item tracking engine 144 may identify a first value 1002*a* that represents the feature 158 from the first image 104*a*, a second value 1002*b* that represents the feature 158 from the second image 104*b*, and so on, similar to that described in FIG. 10.

At 1110, the item tracking engine 144 aggregates the plurality of values 1002 that represents the feature 158. The operation of aggregating the plurality of values 1002 of a feature 158 may vary depending on the feature 158. Various use cases of aggregating the values 1002 of a feature 158 are described in FIG. 10.

At 1112, the item tracking engine 144 associates the item 102 with the aggregated plurality of values 1002.

At 1114, the item tracking engine 144 determines whether to select another feature 158. The item tracking engine 144 may determine to select another feature 158 if at least one feature 158 is left for evaluation. If the item tracking engine 144 determines to select another feature 158, method 1100 may return to 1106. Otherwise, method 1100 may proceed to 1116.

At 1116, the item tracking engine 144 adds a new entry 130 for each image 104 to the training dataset 154 associated with the item identification model 152. In this manner, the item tracking engine 144 may use aggregated metadata to identify the item 102.

Example System for Refining an Item Identification Model Based on Feedback

Figure 12:
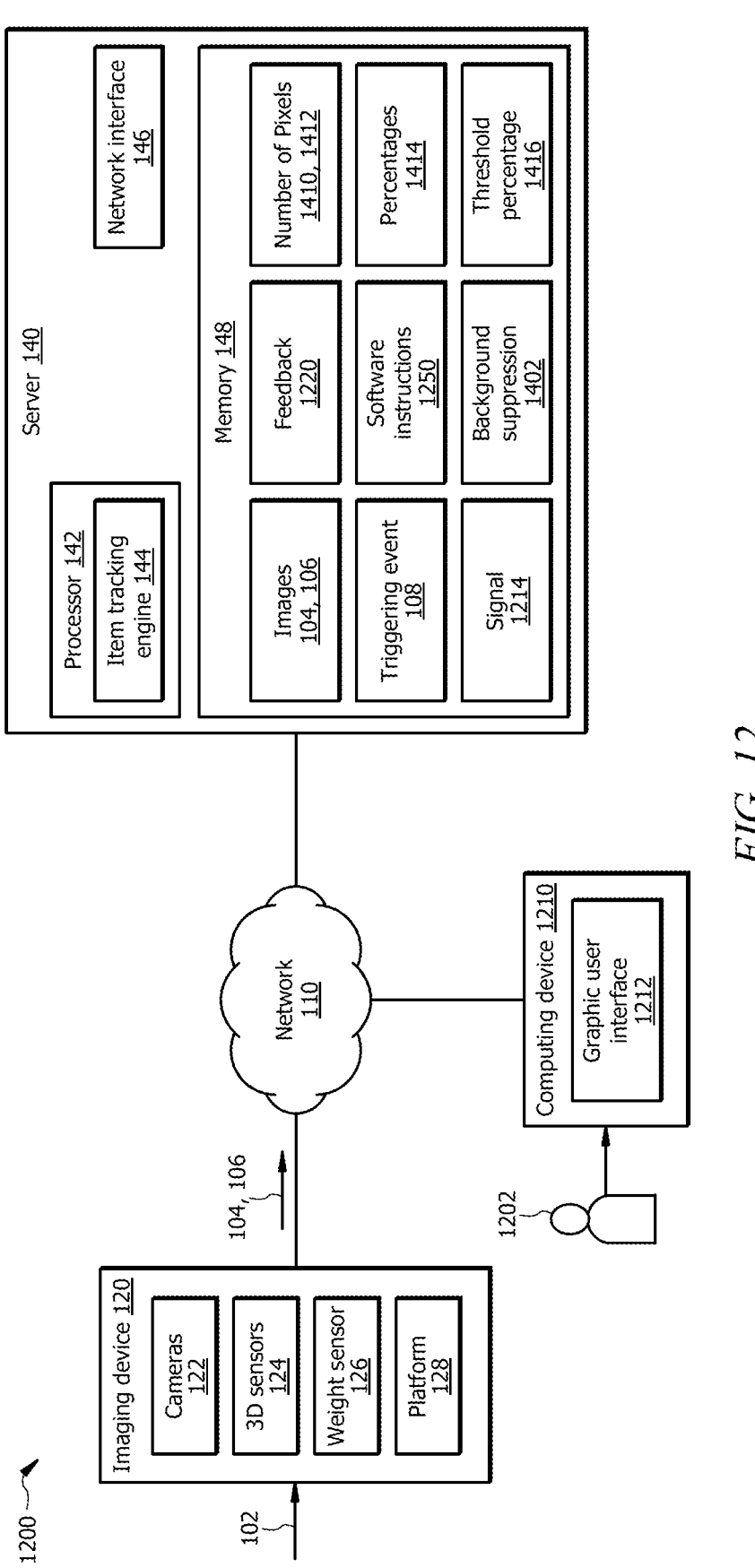
FIG. 12 illustrates one embodiment of a system that is configured to refine an item identification model based on feedback.

FIG. 12 illustrates one embodiment of a system 1200 that is configured to refine an item identification model 152 based on feedback 1220. In one embodiment, system 1200 comprises the network 110, the imaging device 120, the server 140, and a computing device 1210. Aspects of the network 110, the imaging device 120, and the server 140 are described in FIGS. 1-5, additional aspects are described below. Network 110 enables the communication between components of the system 1200. Server 140 comprises the processor 142 in signal communication with the memory 148. Memory 148 stores software instructions 1250 that when executed by the processor 142, cause the processor 142 to perform one or more functions described herein. For example, when the software instructions 1250 are executed, the processor 142 executes the item tracking engine 144 to refine the item identification model 152 based on feedback 1220. In other embodiments, system 1200 may not have all of the components listed and/or may have other elements instead of, or in addition to, those listed above.

In an example scenario, assume that a user 1202 is adding an item 102 to a shopping cart at a store. The user 1202 may place the item 102 on the platform 128 of the imaging device 120 so the cameras 122 of the imaging device 120 can capture images 104 of the item 102. The cameras 122 of the imaging device 120 capture images 104 of the item 102. The imaging device 120 transmits the images 104 to the item tracking engine 144. The item tracking engine 144 may feed the images 104 to the machine learning algorithm 156 of the item identification model 152 to identify the item 102. In some cases, the item 102 in the captured images 104 may be obstructed by other items 102. In some cases, the item 102 may not be completely shown in the images 104. In such cases, the item 102 may be identified incorrectly by the item tracking engine 144, for example, because features 158 of the item 102 extracted from the images 104 may not accurately describe the item 102. Thus, the system 1200 may be configured to refine the item identification model 152 based on feedback 1220. This operation is described in conjunction with the operational flow 1300 of the system 1200 described in FIG. 13 and method 1500 described in FIG. 15.

In some cases, a captured image 104 of an item 102 may include a background portion that shows the area beside the item 102. The background portion in the image 104 may cause the item tracking engine 144 to not be able to extract accurate features 158 of the item 102. For example, additional information that is extracted from the background portion may reduce the accuracy of item identification. Thus, system 1200 may be configured to suppress or minimize the background section in an image 104 by performing a background suppression operation 1402. This process is described in conjunction with the operational flow 1400 of the system 1200 described in FIG. 14.

System Components

Aspects of the server 140 are described in FIGS. 1-5, additional aspects are described below. The memory 148 is further configured to store the software instructions 1250, feedback 1220, background suppression operation 1402, triggering event 108, signal 1214, percentages 1414, and threshold values 1416.

Computing device 1210 is generally any device that is configured to process data and interact with users. Examples of the computing device 1210 include, but are not limited to, a personal computer, a desktop computer, a workstation, a server, a laptop, a tablet computer, etc. The computing device 1210 may include a user interface, such as a display, a microphone, keypad, or other appropriate terminal equipment usable by a user. The computing device 1210 may include a hardware processor, memory, and/or circuitry configured to perform any of the functions or actions of the computing device 1210 described herein. For example, a software application designed using software code may be stored in the memory and executed by the processor to perform the functions of the computing device 1210.

A graphical user interface 1212 may be accessed from the computing device 1210. When one or more items 102 are placed on the platform 128, the imaging device 120 may capture one or more images 104 and/or depth images 106 from the one or more items 102. The imaging device 120 may transmit the captured images 104 and depth images 106 to the server 140. The item tracking engine 144 may identify the one or more items 102 by feeding the captured images 104 and/or the depth images 106 to the machine learning algorithm 156. The item tracking engine 144 may present the identified items 102 on the graphical user interface 1212. A user 1202 can view the identified items 102 on the graphical user interface 1212. The user 1202 may indicate, on the graphical user interface 1212, whether each item 102 is identified correctly, for example, by pressing a button on the graphical user interface 1212. Thus, the user 1202 can provide feedback 1220 indicating whether each item 102 is identified correctly. The feedback 1220 is transmitted to the server 140 from the computing device 1210. The item tracking engine 144 may use the provided feedback 1220 to refine the item identification model 152. This process is described in conjunction with the operational flow 1300 of system 1200 described in FIG. 13 and method 1500 described in FIG. 15.

Operational Flow for Refining an Item Identification Model Based on Feedback

Figure 13:
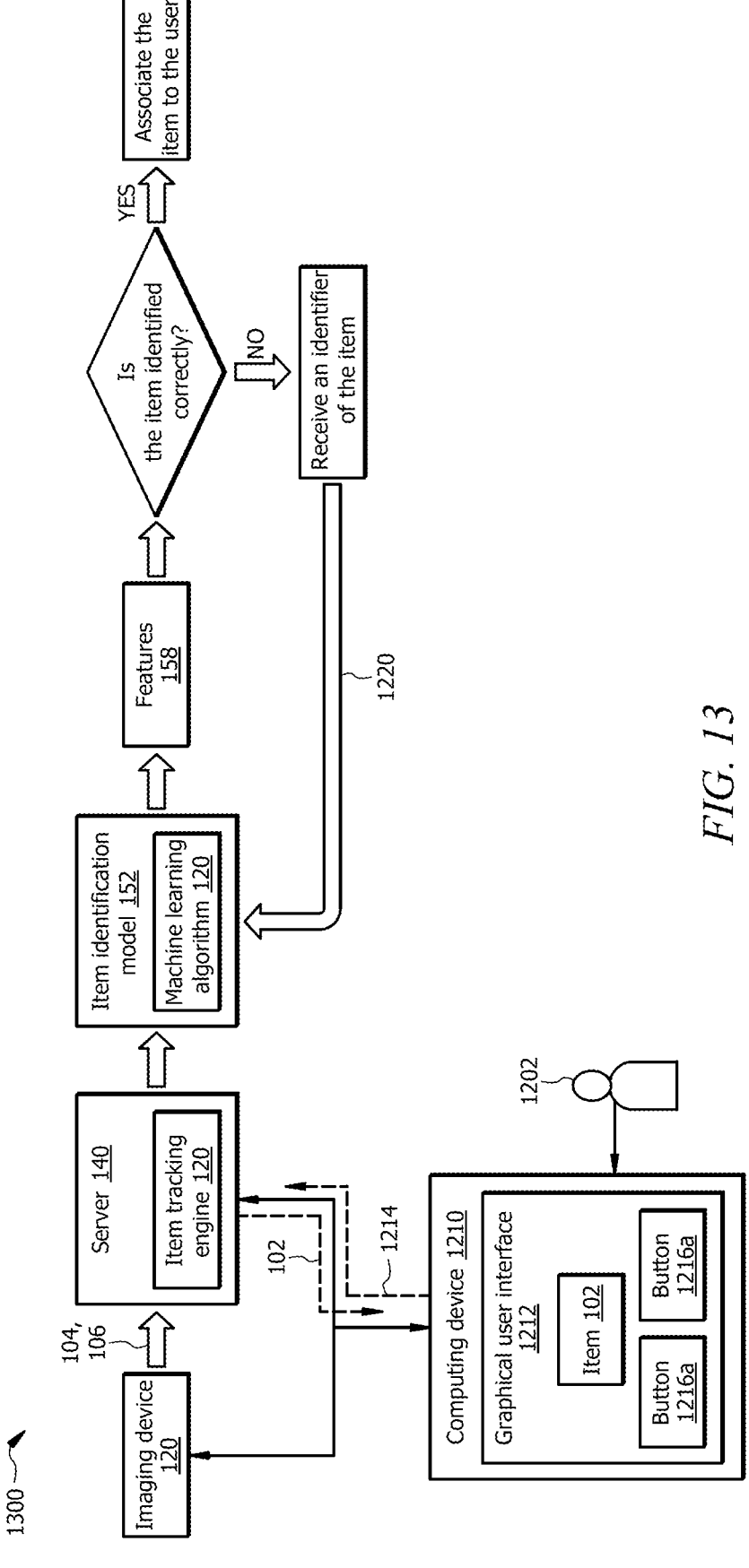
FIG. 13 illustrates an example of an operational flow of the system of FIG. 12 for refining an item identification model based on feedback.

FIG. 13 illustrates an example of an operational flow 1300 of the system 1200 of FIG. 12 for refining an item identification model 152 based on feedback 1220.

Capturing Images of an Item

The operational flow 1300 may begin when the item tracking engine 144 detects a triggering event 108 at the platform 128, similar to that described in FIG. 1. In response, the imaging device 120 may capture one or more images 104 of one or more items 102 that are placed on the platform 128 of the imaging device 120. As noted above, an item 102 may be obstructed by other items 102 in an image 104 or otherwise not fully visible in the image 104. The imaging device 120 transmits the one or more images 104 of one or more items 102 to the server 140.

The item tracking engine 144 may perform one or more operations below for each of the one or more images 104. The item tracking engine 144 may feed the image 104 of the item 102 to the machine learning algorithm 156 of the item identification model 152. The item tracking engine 144 may extract a set of features 158 associated with the item 102 from the image 104.

Similarly, the imaging device 120 may capture one or more depth images 106 of the one or more items 102 placed on the platform 128 of the imaging device 120. The imaging device 120 may transmit the one or more depth images 106 to the server 140. The item tracking engine 144 may feed each of the one or more depth images 106 to the machine learning algorithm 156, and extract the set of features 158 associated with the item 102 from each depth image 106. The process of extracting a set of features 158 associated with the item 102 is described in FIG. 1. The item tracking engine 144 may identify the item 102 based on the extracted set of features 158, similar to that described in FIG. 1.

Determining Whether the Item is Identified Correctly

The item tracking engine 144 may determine whether the item 102 is identified correctly. In this process, the item tracking engine 144 may present the identified item 102 on the graphical user interface 1212. If the item tracking engine 144 receives a signal 1214 from the graphical user interface 1212 indicating that the item 102 is not identified correctly, the item tracking engine 144 determines that the item 102 is not identified correctly. If the item tracking engine 144 receives a signal 1214 from the graphical user interface 1212 indicating that the item 102 is identified correctly, the item tracking engine 144 determines that the item 102 is identified correctly.

For example, the graphical user interface 1212 may include a first button 1216a that a user 1202 can press to indicate that the item 102 is identified correctly. In another example, the graphical user interface 1212 may include a second button 1216b that a user 1202 can press to indicate that the item 102 is not identified correctly.

If the item tracking engine 144 determines that the item 102 is identified correctly, the item tracking engine 144 may associate the item 102 to the user 1202, for example, by adding the item 102 to the shopping cart associated with the user 1202.

If the item tracking engine 144 determines that the item 102 is not identified correctly, the item tracking engine 144 may refine the item identification model 152 based on feedback 1220, as described below.

Refining an Item Identification Model Based on Feedback

In a case where the item 102 is not identified correctly, the user 1202 can scan an identifier 132 of the item 102. For example, the user 1202 can scan a barcode, a QR code, a label associated with the item 102 by a barcode scanner, a QR code scanner, or any other suitable type of scanner. The item tracking engine 144 may receive the identifier 132 of the item 102.

The item tracking engine 144 may identify the item 102 based on the identifier 132 of the item 102. The identifier 132 of the item 102 may be included in the feedback 1220. The item tracking engine 144 may feed the identifier 132 of the item 102 and the one or more captured images 104 of the item 102 to the machine learning algorithm 156 of the item identification model 152.

The item tracking engine 144 may retrain the machine learning algorithm 156 of the item identification model 152 to learn to associate the item 102 to the one or more captured images 104 of the item 102. In this process, the item tracking engine 144 may update weight and bias values of perceptrons in neural network layers of the machine learning algorithm 156. By doing so, the set of features 158 extracted from the one or more images 104 may be updated to present a more accurate representation of the item 102 even from images 104 where the item 102 is not fully visible, e.g., where at least a portion of the item 102 is obstructed by other items 102 and/or at least a portion of the item 102 is not captured in an image 104.

Thus, the item tracking engine 144 may update the set of features 158 associated with the item 102 based on the determined association between the item 102 and the one or more images 104.

Suppressing Background in an Image of an Item

Figure 14:
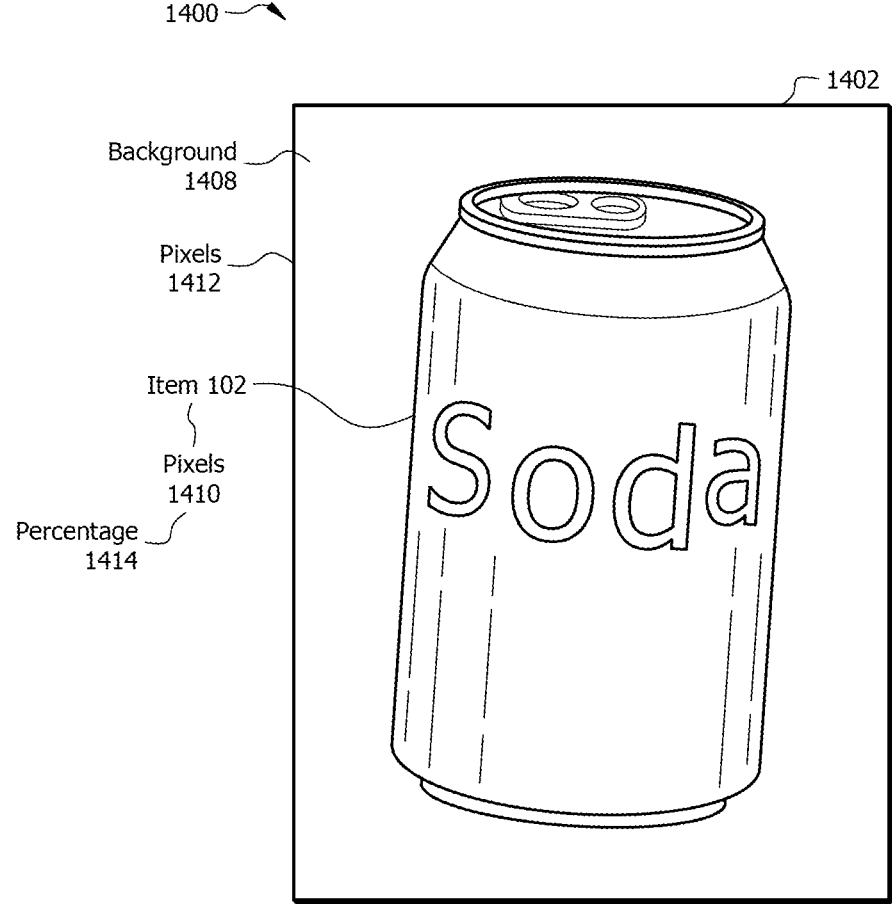
FIG. 14 illustrates an example image of an item on which a background suppression operation is performed by the system of FIG. 12.

FIG. 14 illustrates an example image 104 of an item 102 on which the item tracking engine 144 performs a background suppression operation 1402 by performing the operational flow 1400. In some cases, a captured image 104 of an item 102 may show a background 1408 in addition to the item 102. For a more optimal identification of the item 102, it may be desired to reduce or minimize a portion of the image 104 where the background is shown. To this end, the item tracking engine 144 may perform a background suppression operation 1402, as described below.

In this process, the item tracking engine 144 may determine a first number of pixels 1410 that illustrate the item 102 in the image 104. In other words, the item tracking engine 144 may determine an area in the image 104 that shows the item 102. Similarly, the item tracking engine 144 may determine an overall number of pixels 1412 that form the image 104. Thus, the item tracking engine 144 may determine a second number of pixels (e.g., an area) where the background 1408 is shown.

The item tracking engine 144 may determine a percentage 1414 of the first number of pixels 1410 based on a ratio of the first number of pixels 1410 in relation to the overall number of pixels 1412. The item tracking engine 144 may determine whether the percentage 1414 of the first number of pixels 1410 is less than a threshold percentage 1416. The threshold percentage 1416 may be 80%, 85%, or any other suitable percentage.

If the item tracking engine 144 determines that the percentage 1414 of the first number of pixels 1410 is less than a threshold percentage 1416, the item tracking engine 144 may crop at least a portion of the background 1408 in the image 104 until the percentage 1414 of the first number of pixels 1410 in relation to the overall number of pixels 1412 is more than the threshold percentage 1416. In other words, the item tracking engine 144 may suppress the background 1408 until the percentage 1414 of the first number of pixels 1410 that illustrate the item 102 is more than the threshold percentage 1416. Otherwise, the item tracking engine 144 may not need to further crop the image 104.

Example Method for Refining an Item Identification Model Based on Feedback

Figure 15:
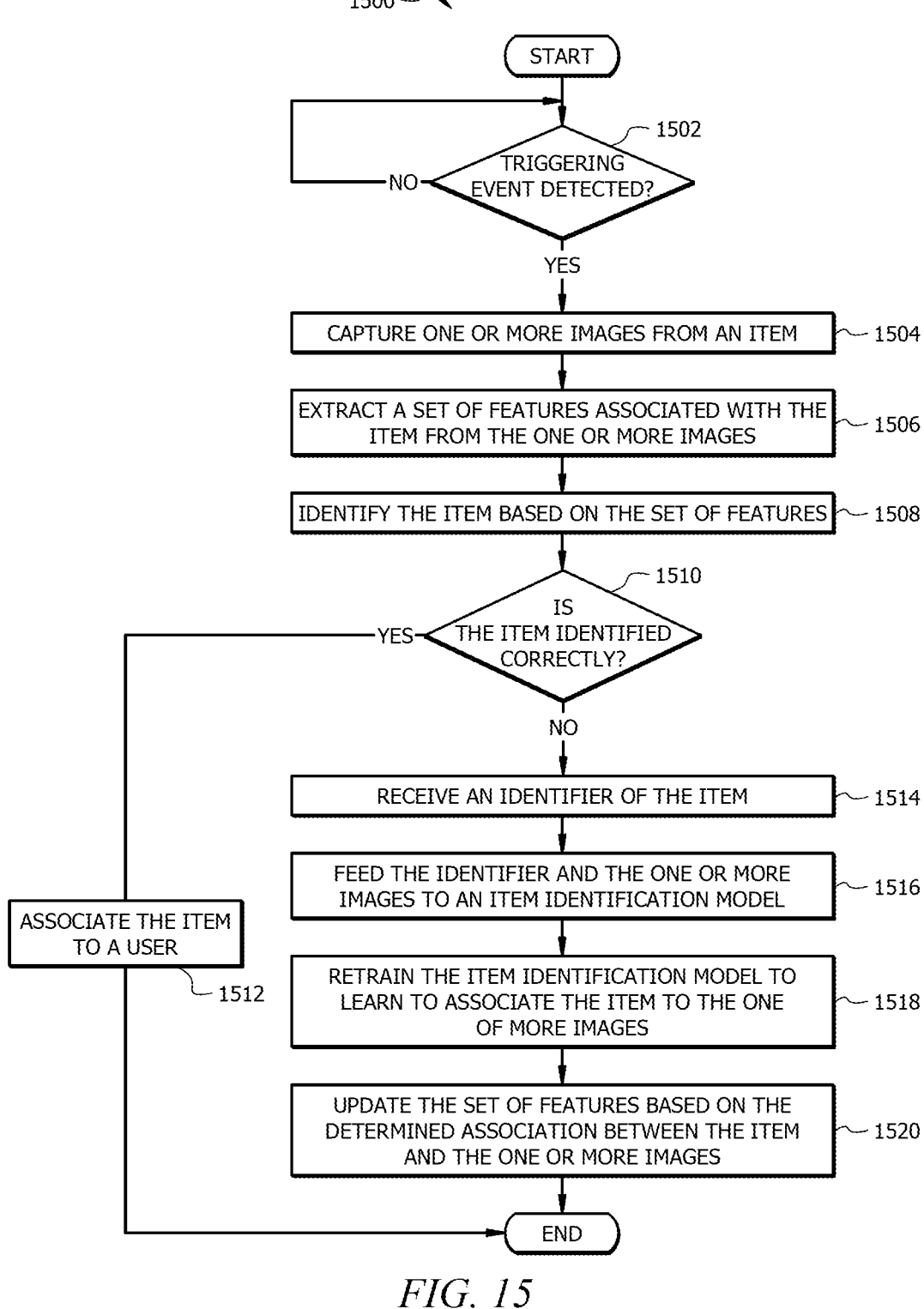
FIG. 15 illustrates an example flowchart of a method for refining an item identification model based on feedback for use in conjunction with the system of FIG. 12.

FIG. 15 illustrates an example flowchart of a method 1500 for refining an item identification model 152 based on feedback 1220. Modifications, additions, or omissions may be made to method 1500. Method 1500 may include more, fewer, or other operations. For example, operations may be performed in parallel or in any suitable order. While at times discussed as the system 1200, processor 142, item tracking engine 144, imaging device 120 or components of any of thereof performing operations, any suitable system or components of the system may perform one or more operations of the method 1500. For example, one or more operations of method 1500 may be implemented, at least in part, in the form of software instructions 1650 of FIG. 12, stored on non-transitory, tangible, machine-readable media (e.g., memory 148 of FIG. 12) that when run by one or more processors (e.g., processor 142 of FIG. 12) may cause the one or more processors to perform operations 1502-1514.

Method 1500 begins at 1502 where the item tracking engine 144 determines whether a triggering event 108 is detected. The triggering event 108 may correspond to a user placing an item 102 on the platform 128. Various embodiments of determining whether a triggering event 108 is detected are described in FIGS. 1 and 6. If the item tracking engine 144 determines that the triggering event 108 is detected, method 1500 proceeds to 1504. Otherwise, method 1500 remains at 1502 until it is determined that the triggering event 108 is detected.

At 1504, the imaging device 120 captures one or more images 104 from an item 102 that is placed on the platform 128 of the imaging device 120 using the cameras 122. Similarly, the imaging device 120 may capture one or more depth images 106 of the item 102 using 3D sensors 124.

At 1506, the item tracking engine 144 extracts a set of features 158 associated with the item 102 from the one or more images 104. In this process, the item tracking engine 144 may feed each image 104 to the machine learning algorithm 156 to extract features 158 associated with the item 102, similar to that described in FIG. 1. Similarly, the item tracking engine 144 may extract the set of features 158 from depth images 106 of the item 102. Examples of the set of features 158 are described in FIG. 1.

At 1508, the item tracking engine 144 identifies the item 102 based on the set of features 158, similar to that described in FIG. 1.

At 1510, the item tracking engine 144 determines whether the item 102 is identified correctly. For example, the item tracking engine 144 may determine whether the item 102 is identified correctly based on a signal 1214 received from a graphical user interface 1212, similar to that described in FIGS. 12 and 13. For example, if the item tracking engine 144 receives a signal 1214 from the graphical user interface 1212 indicating that the item 102 is not identified correctly, the item tracking engine 144 determines that the item 102 is not identified correctly. Otherwise, if the item tracking engine 144 receives a signal 1214 from the graphical user interface 1212 indicating that the item 102 is identified correctly, the item tracking engine 144 determines that the item 102 is identified correctly. If it is determined that the item 102 is identified correctly, method 1500 proceeds to 1512. Otherwise, method 1500 proceeds to 1514.

At 1512, the item tracking engine 144 associates the item 102 to the user 1202. For example, the item tracking engine 144 may add the item 102 to a shopping cart associated with the user 1202.

At 1514, the item tracking engine 144 receives an identifier 132 of the item 102. The identifier 132 of the item 102 may include a barcode, a QR code, a label associated with the item 102. For example, the item tracking engine 144 may receive the identifier 132 of the item 102 when the user 1202 scans the identifier 132 of the item 102 by a barcode scanner, a QR code scanner, etc., communicatively coupled with the imaging device 120 and the server 140, similar to that described in FIG. 13.

At 1516, the item tracking engine 144 feeds the identifier 132 and the one or more images 106 to the item identification model 152. For example, the item tracking engine 144 may feed the identifier 132 and the one or more images 106 to the machine learning algorithm 156 of the item identification model 152.

At 1518, the item tracking engine 144 retrains the item identification model 152 to lean to associate the item 102 to the one or more images 104. The item tracking engine 144 may also retrain the item identification model 152 to lean to associate the item 102 to one or more depth images 106 of the item 102.

At 1520, the item tracking engine 144 updates the set of features 158 based on the determined association between the item 102 and the one or more images 104. Similarly, the item tracking engine 144 may update the set of features 158 based on the determined association between the item 102 and the one or more depth images 106. In certain embodiments, method 1500 may further include operations to perform the background suppression operation 1402, similar to that described in FIG. 14.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for identifying items based on aggregated metadata, comprising:
   a memory operable to store a plurality of images of an item, wherein each image from among the plurality of images shows a different side of the item;
   a processor, operably coupled with the memory, and configured to:
      obtain the plurality of images of the item;
      extract a set of features from each of a first image and a second image from among the plurality of images, wherein each of the set of features represents a physical attribute of the item;
      for a first feature from among the set of features:
         identify a first value of the first feature associated with the first image of the item;
         identify a second value of the first feature associated with the second image;
         aggregate the first value with the second value; and
         associate the item with the aggregated first value and second value, wherein the aggregated first value and second value represent the first feature of the item; and
      identify the item based at least in part upon the aggregated first value and second value.

2. The system of claim 1, wherein the processor is further configured to, for a second feature from among the set of features:
   identify a third value of the second feature associated with the first image of the item;

identify a fourth value of the second feature associated with the second image of the item;
   aggregate the third value with the fourth value; and
   identify the item based at least in part upon the aggregated third value and fourth value.

3. The system of claim 1, wherein:
   the first feature comprises one or more dominant colors of the item;
   the processor is further configured to:
      identify one or more first dominant colors of the item from the first image of the item, wherein each dominant color from among the one or more first dominant colors is determined based at least in part upon determining that a number of pixels that have the dominant color is more than a threshold number;
      determine a first percentage of each dominant color from among the one or more first dominant colors, wherein the first percentage of a first dominant color in the first image is determined by determining a ratio of a number of pixels that has the first dominant color in relation to the total number of pixels illustrating the item in the first image;
      identify one or more second dominant colors of the item from the second image of the item, wherein each dominant color from among the or more second dominant colors is determined based at least in part upon determining that a number of pixels that have the dominant color is more than the threshold number;
      determine a second percentage of each dominant color from among the one or more second dominant colors, wherein the second percentage of a second dominant color in the second image is determined by determining a ratio of a number of pixels that has the second dominant color in relation to the total number of pixels illustrating the item in the second image;
      determine the one or more dominant colors of the item by determining which dominant colors from among the one or more first dominant colors and the one or more second dominant colors have percentages more than a threshold percentage; and
      associate the one or more dominant colors to the item.

4. The system of claim 1, further comprising a weight sensor configured to measure weights for items on a platform, wherein:
   the first feature comprises a weight of the item;
   the processor is further configured to:
      receive a plurality of weights of multiple instances of the item;
      determine a mean of the plurality of weights of the item; and
      associate the mean of the plurality of weights of the item to the item.

5. The system of claim 1, wherein:
   the first feature comprises a dimension of the item;
   the processor is further configured to:
      identify a first dimension of the item from the first image, wherein the first dimension is represented by a first width, a first length, and a first height for the item detected on the first image;
      identify a second dimension of the item from the second image, wherein the second dimension is represented by a second width, a second length, and a second height of the item;
      determine the dimension of the item by determining a mean of the first dimension and the second dimension; and associate the mean of the first dimension and the second dimension to the item.

6. The system of claim 1, wherein:

the first feature comprises a mask of the item;

the processor is further configured to:

identify a first mask that defines a first contour around the item in the first image;

identify a second mask that defines a second contour around the item in the second image;

determine differences between the first mask and the second mask;

determine at least a portion of a three-dimensional mask around the item based at least in part upon the determined differences between the first mask and the second mask; and associate the three-dimensional mask around the item to the item.

7. The system of claim 6, wherein determining the three-dimensional mask around the item is in response to determining that the item is not identified based on the mask of the item.

8. The system of claim 2, wherein the processor is further configured to identify the item based at least in part upon the first feature and the second feature.

9. A method for identifying items based on aggregated metadata, comprising:

obtaining a plurality of images of an item;

extracting a set of features from each of a first image and a second image from among the plurality of images, wherein each of the set of features represents a physical attribute of the item;

for a first feature from among the set of features:

identifying a first value of the first feature associated with the first image of the item;

identifying a second value of the first feature associated with the second image;

aggregating the first value with the second value; and associating the item with the aggregated first value and second value, wherein the aggregated first value and second value represent the first feature of the item; and identifying the item based at least in part upon the aggregated first value and second value.

10. The method of claim 9, further comprising, for a second feature from among the set of features:

identifying a third value of the second feature associated with the first image of the item;

identifying a fourth value of the second feature associated with the second image of the item;

aggregating the third value with the fourth value;

associating the item with the aggregated third value and fourth value, wherein the aggregated third value and fourth value represent the second feature of the item; and identifying the item based at least in part upon the aggregated third value and fourth value.

11. The method of claim 9, further comprising:

identifying one or more first dominant colors of the item from the first image of the item, wherein each dominant color from among the one or more first dominant colors is determined based at least in part upon determining that a number of pixels that have the dominant color is more than a threshold number;

determining a first percentage of each dominant color from among the one or more first dominant colors, wherein the first percentage of a first dominant color in the first image is determined by determining a ratio of a number of pixels that has the first dominant color in relation to the total number of pixels illustrating the item in the first image;

identifying one or more second dominant colors of the item from the second image of the item, wherein each dominant color from among the or more second dominant colors is determined based at least in part upon determining that a number of pixels that have the dominant color is more than the threshold number;

determining a second percentage of each dominant color from among the one or more second dominant colors, wherein the second percentage of a second dominant color in the second image is determined by determining a ratio of a number of pixels that has the second dominant color in relation to the total number of pixels illustrating the item in the second image;

determining one or more dominant colors of the item by determining which dominant colors from among the one or more first dominant colors and the one or more second dominant colors have percentages more than a threshold percentage; and associating the one or more dominant colors to the item.

12. The method of claim 9, further comprising:

receiving a plurality of weights of multiple instances of the item;

determining a mean of the plurality of weights of the item; and associating the mean of the plurality of weights of the item to the item.

13. The method of claim 9, further comprising:

identifying a first dimension of the item from the first image, wherein the first dimension is represented by a first width, a first length, and a first height for the item detected on the first image;

identifying a second dimension of the item from the second image, wherein the second dimension is represented by a second width, a second length, and a second height of the item;

determining a dimension of the item by determining a mean of the first dimension and the second dimension; and associating the mean of the first dimension and the second dimension to the item.

14. The method of claim 9, further comprising:

identifying a first mask that defines a first contour around the item in the first image;

identifying a second mask that defines a second contour around the item in the second image;

determining differences between the first mask and the second mask;

determining at least a portion of a three-dimensional mask around the item based at least in part upon the determined differences between the first mask and the second mask; and associating the three-dimensional mask around the item to the item.

15. The method of claim 14, wherein determining the three-dimensional mask around the item is in response to determining that the item is not identified based on the mask of the item.

16. A non-transitory computer-readable medium storing instructions that when executed by a processor cause the processor to:

obtain a plurality of images of an item;

extract a set of features from each of a first image and a second image from among the plurality of images, wherein each of the set of features represents a physical attribute of the item;

for a first feature from among the set of features:

identify a first value of the first feature associated with the first image of the item;

identify a second value of the first feature associated with the second image;

aggregate the first value with the second value; and associate the item with the aggregated first value and second value, wherein the aggregated first value and second value represent the first feature of the item; and identify the item based at least in part upon the aggregated first value and second value.

17. The non-transitory computer-readable medium of claim 16, wherein the instructions further cause the processor to, for a second feature from among the set of features:

identify a third value of the second feature associated with the first image of the item;

identify a fourth value of the second feature associated with the second image of the item;

aggregate the third value with the fourth value;

associate the item with the aggregated third value and fourth value, wherein the aggregated third value and fourth value represent the second feature of the item; and identify the item based at least in part upon the aggregated third value and fourth value.

18. The non-transitory computer-readable medium of claim 16, wherein the instructions further cause the processor to:

identify one or more first dominant colors of the item from the first image of the item, wherein each dominant color from among the one or more first dominant colors is determined based at least in part upon determining that a number of pixels that have the dominant color is more than a threshold number;

determine a first percentage of each dominant color from among the one or more first dominant colors, wherein the first percentage of a first dominant color in the first image is determined by determining a ratio of a number of pixels that has the first dominant color in relation to the total number of pixels illustrating the item in the first image;

identify one or more second dominant colors of the item from the second image of the item, wherein each dominant color from among the or more second dominant colors is determined based at least in part upon determining that a number of pixels that have the dominant color is more than the threshold number;

determine a second percentage of each dominant color from among the one or more second dominant colors, wherein the second percentage of a second dominant color in the second image is determined by determining a ratio of a number of pixels that has the second dominant color in relation to the total number of pixels illustrating the item in the second image;

determine one or more dominant colors of the item by determining which dominant colors from among the one or more first dominant colors and the one or more second dominant colors have percentages more than a threshold percentage; and associate the one or more dominant colors to the item.

19. The non-transitory computer-readable medium of claim 16, wherein the instructions further cause the processor to:

receive a plurality of weights of multiple instances of the item;

determine a mean of the plurality of weights of the item; and associate the mean of the plurality of weights of the item to the item.

20. The non-transitory computer-readable medium of claim 16, wherein the instructions further cause the processor to:

identify a first dimension of the item from the first image, wherein the first dimension is represented by a first width, a first length, and a first height for the item detected on the first image;

identify a second dimension of the item from the second image, wherein the second dimension is represented by a second width, a second length, and a second height of the item;

determine a dimension of the item by determining a mean of the first dimension and the second dimension; and associate the mean of the first dimension and the second dimension to the item.

* * * * *